(12) United States Patent
Parker et al.

(10) Patent No.: US 11,100,395 B2
(45) Date of Patent: *Aug. 24, 2021

(54) ANALYTIC SYSTEM FOR INTERACTIVE DIRECT FUNCTIONAL PRINCIPAL COMPONENT ANALYSIS

(71) Applicant: SAS Institute Inc., Cary, NC (US)

(72) Inventors: Ryan Jeremy Parker, Raleigh, NC (US); Clayton Adam Barker, Cary, NC (US); Christopher Michael Gotwalt, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/158,062

(22) Filed: Jan. 26, 2021

(65) Prior Publication Data

US 2021/0174207 A1 Jun. 10, 2021

Related U.S. Application Data

(63) Continuation-in-part of application No. 16/919,309, filed on Jul. 2, 2020, now Pat. No. 10,963,788.

(Continued)

(51) Int. Cl.
*G06N 3/08* (2006.01)
*G06F 16/22* (2019.01)
(Continued)

(52) U.S. Cl.
CPC .......... *G06N 3/08* (2013.01); *G06F 16/2228* (2019.01); *G06F 17/16* (2013.01); *G06F 17/17* (2013.01)

(58) Field of Classification Search
CPC .......... G06N 3/08; G06F 17/17; G06F 17/16; G06F 16/2228
See application file for complete search history.

(56) References Cited

U.S. PATENT DOCUMENTS

| 2005/0149902 | A1* | 7/2005 | Shi | G03F 1/36 716/52 |
|---|---|---|---|---|
| 2018/0032836 | A1* | 2/2018 | Hurter | G06K 9/4638 |
| 2018/0073724 | A1* | 3/2018 | Kim | F22B 35/00 |

OTHER PUBLICATIONS

Lanczos algorithm, Wikipedia, retrieved from https://en.wikipedia.org/w/index.pho?title=Lanczos_algorithm&oldid=986530101, last edited on Nov. 1, 2020.

(Continued)

*Primary Examiner* — Kamran Afshar
*Assistant Examiner* — Imad Kassim
(74) *Attorney, Agent, or Firm* — Bell & Manning, LLC

(57) ABSTRACT

An analytic system provides direct functional principal component analysis. (A) A next group variable value is selected from values of a group variable. (B) Explanatory variable values of observations having the selected next group variable value are sorted in ascending order. (C) The response variable value associated with each sorted explanatory variable value is stored in a next row of a data matrix. (D) (A) through (C) are repeated. (E) An eigenfunction index is incremented. (F) An FPCA is performed using the data matrix to define an eigenfunction for the eigenfunction index. (G) (E) and (F) are repeated. (H) FPCA results from the performed FPCA are presented within a window of a display. The FPCA results include an eigenvalue and an eigenfunction associated with the eigenvalue for each functional principal component identified from the performed FPCA in (F).

29 Claims, 19 Drawing Sheets

Related U.S. Application Data

(60) Provisional application No. 62/944,110, filed on Dec. 5, 2019, provisional application No. 62/964,906, filed on Jan. 23, 2020, provisional application No. 63/106,473, filed on Oct. 28, 2020.

(51) Int. Cl.
*G06F 17/16* (2006.01)
*G06F 17/17* (2006.01)

(56) References Cited

OTHER PUBLICATIONS

Cornelius Lanczos, "An Iteration Method for the Solution of the Eigenvalue Problem of Linear Differential and Integral Operators," Journal of Research of the National Bureau of Standards, vol. 45, No. 4, Oct. 1950, pp. 255-282.
Rasmus Munk Larsen, "Combining implicit restarts and partial reorthogonalization in Lanczos bidiagonalization," UC Berkeley, Apr. 2001.
Rasmus Munk Larsen, "Lanczos bidiagonalization with partial reorthogonalization," DAIMI Report Series, 27(537). https://doi.org/10.7146/dpb.v27i537.7070, 1998.
Principal component analysis—Wikipedia, retrieved from https://en.wikipedia.org/w/index.php?title=Principal_component-analysis&oldid=98972680, last edited Nov. 20, 2020.

* cited by examiner

FIG. 3

ANALYTIC SYSTEM FOR INTERACTIVE DIRECT FUNCTIONAL PRINCIPAL COMPONENT ANALYSIS

CROSS-REFERENCE TO RELATED APPLICATIONS

The present application claims priority under 35 U.S.C. § 119(e) to U.S. Provisional Patent Application No. 63/106,473 filed on Oct. 28, 2020, the entire contents of which are hereby incorporated by reference.

The present application is also a continuation-in-part of U.S. patent application Ser. No. 16/919,309 that was filed Jul. 2, 2020, the entire contents of which are hereby incorporated by reference. U.S. patent application Ser. No. 16/919,309 claimed priority under 35 U.S.C. § 119(e) to U.S. Provisional Patent Application No. 62/944,110 filed on Dec. 5, 2019, the entire contents of which are hereby incorporated by reference. U.S. patent application Ser. No. 16/919,309 claimed priority under 35 U.S.C. § 119(e) to U.S. Provisional Patent Application No. 62/964,906 filed on Jan. 23, 2020, the entire contents of which are hereby incorporated by reference.

BACKGROUND

Principal component analysis (PCA) is used in exploratory data analysis and to develop predictive models with reduced dimensionality by projecting each data point onto a number of principal components to obtain lower-dimensional data while preserving as much of the data's variation as possible. Exploratory analysis benefits from an interactive graphical system that allows the user to easily explore variations. The principal components are a sequence of direction vectors, where each $i^{th}$ direction vector is a direction of a line that best fits the data while being orthogonal to the previous direction vectors, where a best-fitting line may be defined as one that minimizes an average squared distance from the data points to the line. The sequence of direction vectors defines an orthonormal basis in which different individual dimensions of the data are linearly uncorrelated. A first principal component can be defined as a direction that maximizes a variance of the projected data.

The principal components are eigenvectors of the data's covariance matrix. Thus, the principal components are often computed by eigen decomposition of the data covariance matrix or singular value decomposition of the data matrix. Using eigen decomposition and singular value decomposition, all of the eigenvalues are computed regardless of a number of eigenvalues desired. Additionally, eigen decomposition and singular value decomposition may not provide an accurate representation for sparse matrices.

SUMMARY

In an example embodiment, a non-transitory computer-readable medium is provided having stored thereon computer-readable instructions that, when executed by a computing device, cause the computing device to provide direct functional principal component analysis. A dataset is read that includes a plurality of observation vectors defined for each value of a plurality of values of a group variable. Each observation vector of each plurality of observation vectors includes an explanatory variable value of an explanatory variable and a response variable value of a response variable. (A) A next group variable value is selected from the plurality of values of the group variable. (B) The explanatory variable values of the plurality of observation vectors having the selected next group variable value are sorted in ascending order. (C) The response variable value associated with each sorted explanatory variable value from (B) is stored in a next row of a data matrix. (D) (A) through (C) are repeated until each unique group variable value is selected from the plurality of values of the group variable in (A). (E) An eigenfunction index is incremented. (F) A functional principal component analysis (FPCA) is performed using the data matrix to define an eigenfunction for the incremented eigenfunction index. (G) (E) and (F) are repeated until a predefined number of eigenfunctions is defined in (E) or an eigenfunctions complete value indicates that defining eigenfunctions is done. (H) FPCA results from the performed FPCA are presented within a window of a display. The FPCA results include an eigenvalue and an eigenfunction associated with the eigenvalue for each functional principal component identified from the performed FPCA in (F).

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to provide direct functional principal component analysis.

In yet another example embodiment, a method of direct functional principal component analysis is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 3 shows a user interface supported by the model selection application of FIGS. 2A and 2B and used to present a dataset window in accordance with an illustrative embodiment.

DETAILED DESCRIPTION

Figure 1:
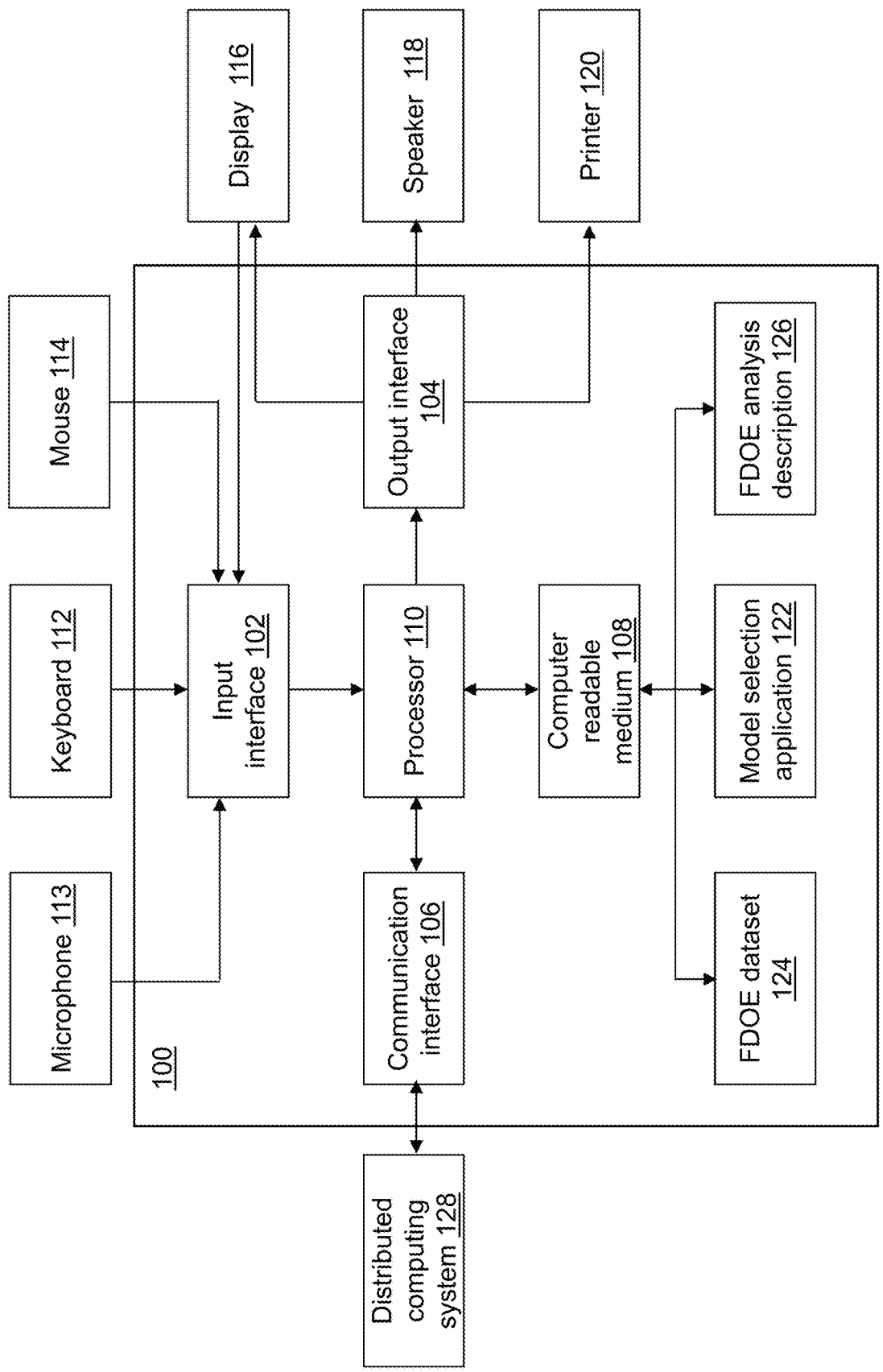
FIG. 1 depicts a block diagram of a model selection device in accordance with an illustrative embodiment.

Referring to FIG. 1, a block diagram of a model selection device 100 is shown in accordance with an illustrative embodiment. Model selection device 100 provides interactive streamlined model selection based on analysis of functional design of experiments (FDOE) data. Model selection device 100 may include an input interface 102, an output interface 104, a communication interface 106, a non-transitory computer-readable medium 108, a processor 110, a model selection application 122, an FDOE dataset 124, and an FDOE analysis description 126. Model selection application 122 provides an interactive and intuitive graphical user interface for users to directly build models that allow them to identify how the data stored in FDOE dataset 124 may impact a functional response. The analytic and model information may be stored in FDOE analysis description 126 for use as a trained model to predict new responses and/or to identify relevant variables for training a model to predict new responses. Fewer, different, and/or additional components may be incorporated into model selection device 100.

A goal of design of experiments (DOE) is to describe and explain a variation of information under conditions hypothesized to reflect a variation in one or more dependent variables, also referred to as output variables or response variables, based on one or more independent variables, also referred to as input variables or explanatory variables. For example, in an experiment to quantify a yield of a manufacturing process, the dependent variable may be the yield, or amount of product produced. This manufacturing process has several variables that can be controlled, such as the heat in the process, or the speed of the process, and these may be the independent variables. The one or more independent variables associated with the one or more dependent variables may further be associated with a group variable that may be defined based on each unique experiment. Using the group variable, the variation associated with the one or more independent variables associated with the one or more dependent variables captures a behavior under one or more experimental conditions. One or more factor variables further may be evaluated as part of the model selection to determine their effect on the one or more dependent variables. The one or more factor variables may be observed during each experiment. In addition, it is not required that the data come from a pre-designed experiment. FDOE dataset 124 can also come from an observational study that similarly involves one or more independent variables to be associated with one or more dependent variables. For illustration, based on a dataset that includes weekly weather data from a plurality of weather stations around the world, a group variable may be a name of the weather station, dependent variables may include a week of the year, a latitude, a longitude, an elevation, etc., and an independent variable may be a maximum temperature, a minimum temperature, an average temperature, etc.

Model selection application 122 performs operations associated with defining FDOE analysis description 126 from data stored in FDOE dataset 124 and with allowing the user of model selection device 100 to interactively select the model input parameters, also referred to as hyperparameters, based on information presented in display 116. FDOE analysis description 126 may be used to indicate one or more variables selected from the one or more explanatory variables and/or the one or more factor variables that are useful in training another predictive model to predict a response variable value for data stored in a training dataset 924 (shown referring to FIG. 9).

Model selection application 122 is easy to use and provides approximately instantaneous feedback so that the user can quickly and efficiently adjust model parameters. Alternative solutions require the user to store data generated as one part of the analysis for input to another process to perform another part of the analysis, while model selection application 122 allows the user to easily change all or any subset of the data analysis or model design parameters as needed to effectively explore, understand, and model the data stored in FDOE dataset 124.

Model selection application 122 further provides a direct functional principal component analysis (FPCA) computation from FDOE dataset 124 that may include a smoothing function. Direct FPCA iteratively computes a predefined number of principal components or a number of principal components that explain a predefined variation in the data without computing all of the principal components. Though there are many algorithm variations, the direct FPCA computation performed by model selection application 122 is based on a Lanczos algorithm described in a paper by Cornelius Lanczos, An iteration method for the solution of the eigenvalue problem of linear differential and integral operators, Journal of Research of the National Bureau of Standards, 45 (4) pp. 255-282 (1950). The direct FPCA computation performed by model selection application 122 does not require a computation of all of the principal components making it much faster than eigen decomposition and singular value decomposition and doe snot require application of a smoothing function such as a b-spline to data read from FDOE dataset 124.

Input interface 102 provides an interface for receiving information from the user or another device for entry into model selection device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into model selection device 100 or to make selections presented in a user interface displayed on display 116.

The same interface may support both input interface 102 and output interface 104. For example, display 116 comprising a touch screen provides a mechanism for user input and for presentation of output to the user. Model selection device 100 may have one or more input interfaces that use the same or a different input interface technology. The input interface technology further may be accessible by model selection device 100 through communication interface 106.

Output interface 104 provides an interface for outputting information for review by a user of model selection device 100 and/or for use by another application or device. For example, output interface 104 may interface with various output technologies including, but not limited to, display 116, a speaker 118, a printer 120, etc. Model selection device 100 may have one or more output interfaces that use the same or a different output interface technology. The output interface technology further may be accessible by model selection device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Model selection device 100 may have one or more communication interfaces that use the same or a different communication interface technology. For example, model selection device 100 may support communication using an Ethernet port, a Bluetooth antenna, a telephone jack, a USB port, etc. Data and messages may be transferred between model selection device 100 and another computing device of distributed computing system 128 using communication interface 106.

Computer-readable medium 108 is a non-transitory electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. model selection device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Model selection device 100 also may have one or more drives that support the loading of a memory media such as a CD, DVD, an external hard drive, etc. One or more external hard drives further may be connected to model selection device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc.

Some processors may be central processing units (CPUs). Some processes may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Model selection device 100 may include a plurality of processors that use the same or a different processing technology.

Some or all of the operations described herein may be embodied in model selection application 122. The operations may be implemented using hardware, firmware, software, or any combination of these methods. Referring to the example embodiment of FIG. 1, model selection application 122 is implemented in software (comprised of computer-readable and/or computer-executable instructions) stored in computer-readable medium 108 and accessible by processor 110 for execution of the instructions that embody the operations of model selection application 122. Model selection application 122 may be written using one or more programming languages, assembly languages, scripting languages, etc.

Model selection application 122 may be integrated with other analytic tools. As an example, model selection application 122 may be part of an integrated data analytics software application and/or software architecture such as that offered by SAS Institute Inc. of Cary, N.C., USA. For example, model selection application 122 may be integrated with a prediction application 922 (shown referring to FIG. 9) and/or with a model training application 922 (shown referring to FIG. 11). Merely for illustration, model selection application 122 may be implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA. Data mining, statistical analytics, and response prediction are applicable in a wide variety of industries to solve technical problems.

Model selection application 122 may be implemented as a Web application. For example, model selection application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

FDOE dataset 124 may include, for example, a plurality of rows and a plurality of columns. The plurality of rows may be referred to as observation vectors or records (observations), and the columns may be referred to as variables. In an alternative embodiment, FDOE dataset 124 may be transposed. The plurality of variables may include a response variable y and an explanatory variable x for each observation vector. Input dataset 124 may include additional variables that are not response variable y or explanatory variable x. An $i^{th}$ observation vector may be defined as $(y_i, x_i)$ that may include a value for response variable y and explanatory variable x.

The plurality of variables may further include a group variable g that separately identifies each experiment as well as one or more factor variables f. Based on this, an observation vector may be defined as $(y_i, x_i, g_i, f_i)$ that may include a value for the response variable y, a value for the explanatory variable x, a value for the group variable g, and a value for each of the one or more factor variables f associated with an $i^{th}$ observation vector i.

One or more variables of the plurality of variables may describe a characteristic of a physical object. For example, if FDOE dataset 124 includes data related to operation of a vehicle, the variables may include an oil pressure, a speed, a gear indicator, a gas tank level, a tire pressure for each tire, an engine temperature, a radiator level, etc.

FDOE dataset 124 may include data captured as a function of time for one or more physical objects. The data stored in FDOE dataset 124 may be generated by and/or captured from a variety of sources including one or more sensors of the same or different type, one or more computing devices, etc. Data stored in FDOE dataset 124 may be sensor measurements or signal values captured by a sensor, may be generated or captured in response to occurrence of an event or a transaction, generated by a device such as in response to an interaction by a user with the device, etc. For example, in data science, engineering, and statistical applications, data often consists of multiple measurements (across sensors, characteristics, responses, etc.) collected across multiple time instances (patients, test subjects, experiments, geographic locations, etc.). These measurements may be collected in FDOE dataset 124 for analysis and processing. The data stored in FDOE dataset 124 may be captured at different time points periodically, intermittently, when an event occurs, etc. One or more columns of FDOE dataset 124 may include a time and/or a date value.

The data stored in FDOE dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA.

FDOE dataset 124 may include data captured at a high data rate such as 200 or more observation vectors per second for one or more physical objects of the same or different type. For example, data stored in FDOE dataset 124 may be generated as part of the Internet of Things (IoT), where things (e.g., machines, devices, phones, sensors) can be connected to networks and the data from these things collected and processed within the things and/or external to the things before being stored in FDOE dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Again, some data may be processed with an ESPE, which may reside in the cloud or in an edge device before being stored in FDOE dataset 124.

The data stored in FDOE dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

FDOE dataset 124 may be stored using various data structures as known to those skilled in the art including one or more files of a file system, a relational database, one or more tables of a system of tables, a structured query language database, a SAS® dataset, etc. on model selection device 100 or on distributed computing system 128. The data may be organized using delimited fields, such as comma or space separated fields, fixed width fields, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

FDOE dataset 124 may be stored on computer-readable medium 108 or on one or more computer-readable media of distributed computing system 128 and accessed by model selection device 100 using communication interface 106, input interface 102, and/or output interface 104. Model selection device 100 may coordinate access to FDOE dataset 124 that is distributed across distributed computing system 128 that may include one or more computing devices. For example, FDOE dataset 124 may be stored in a cube distributed across a grid of computers as understood by a person of skill in the art. As another example, FDOE dataset 124 may be stored in a multi-node Hadoop® cluster. For instance, Apache™ Hadoop® is an open-source software framework for distributed computing supported by the Apache Software Foundation. As another example, FDOE dataset 124 may be stored in a cloud of computers and accessed using cloud computing technologies, as understood by a person of skill in the art. The SAS® LASR™ Analytic Server may be used as an analytic platform to enable multiple users to concurrently access data stored in FDOE dataset 124. The SAS® Viya™ open, cloud-ready, in-memory architecture also may be used as an analytic platform to enable multiple users to concurrently access data stored in FDOE dataset 124. SAS® Cloud Analytic Services (CAS) may be used as an analytic server with associated cloud services in SAS® Viya™. Some systems may use SAS In-Memory Statistics for Hadoop® to read big data once and analyze it several times by persisting it in-memory for the entire session. Some systems may be of other types and configurations.

Figure 2A:
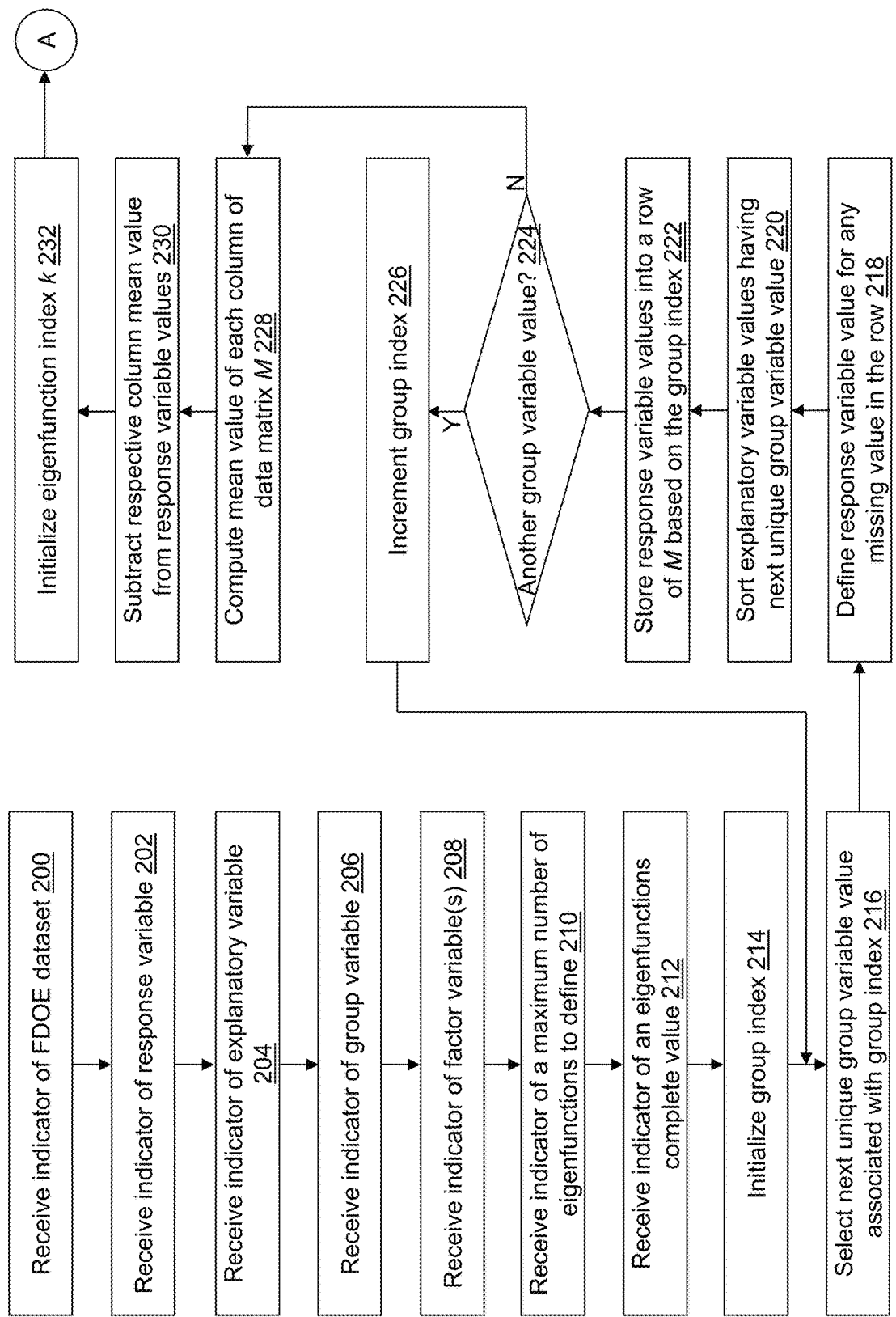
FIGS. 2A and 2B depict a flow diagram illustrating examples of operations performed by a model selection application of the model selection device of FIG. 1 in accordance with an illustrative embodiment.
Figure 2B:
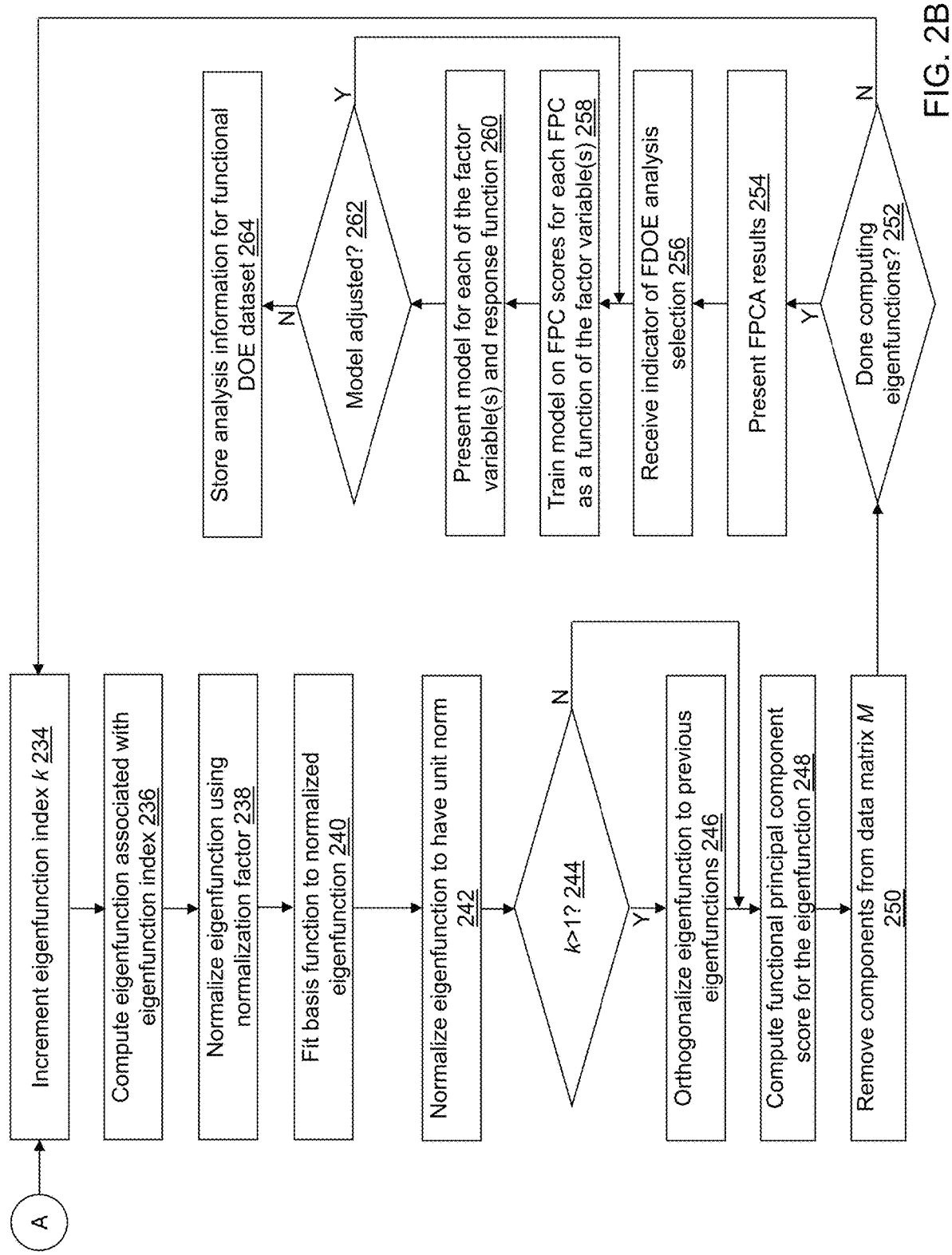

Referring to FIGS. 2A and 2B, example operations associated with model selection application 122 are described. Additional, fewer, or different operations may be performed depending on the embodiment of model selection application 122. The order of presentation of the operations of FIGS. 2A and 2B is not intended to be limiting. Some of the operations may not be performed in some embodiments. Although some of the operational flows are presented in sequence, the various operations may be performed in various repetitions, concurrently (in parallel, for example, using threads and/or distributed computing system 128), and/or in other orders than those that are illustrated. For example, a user may execute model selection application 122, which causes presentation of a first user interface window, which may include a plurality of menus and selectors such as drop-down menus, buttons, text boxes, hyperlinks, etc. associated with model selection application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by model selection application 122.

Figure 3:
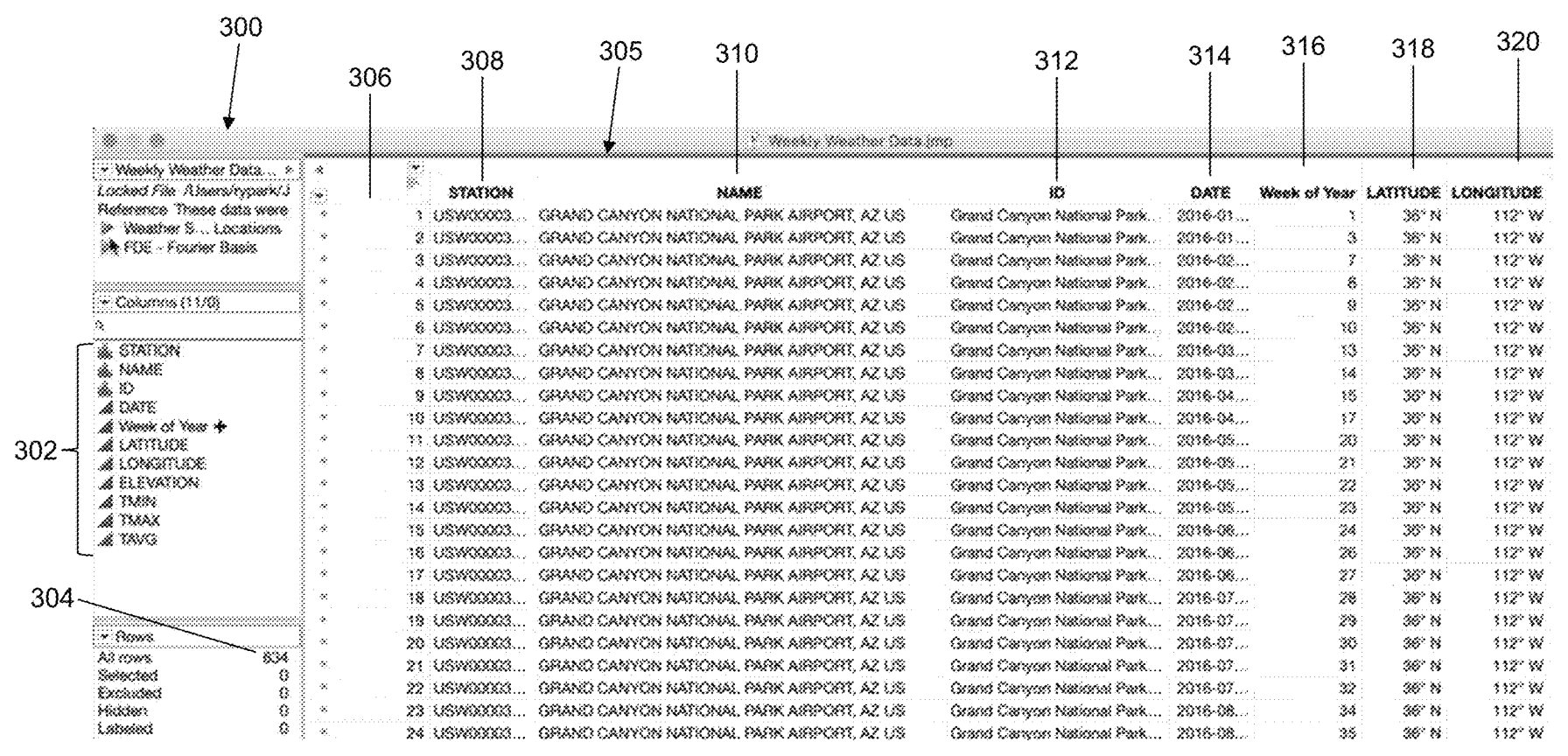

Referring to FIG. 2A, in an operation 200, a first indicator may be received that indicates FDOE dataset 124. For example, the first indicator indicates a location and a name of FDOE dataset 124. As an example, the first indicator may be received by model selection application 122 after selection from a user interface window or after entry by a user into a user interface window. In an alternative embodiment, FDOE dataset 124 may not be selectable. For example, a most recently created dataset may be used automatically. For illustration, referring to FIG. 3, a dataset window 300 is shown in accordance with an illustrative embodiment. Dataset window 300 may include a variable list 302 read from FDOE dataset 124 that is weekly weather data, a number of rows indicator 304 that indicates a number of observation vectors read from FDOE dataset 124, and a data table 305. Variable list 302 may include a list of variables read from FDOE dataset 124 based on a name associated with each column. Data table 305 may include a plurality of columns that each include a data value for each observation vector. In the illustrative embodiment of FIG. 3, data tables 305 includes a row counter column 306, a station column 308, a station name column 310, a station identifier (ID) column 312, a date column 314, a week of the year column 316, a station latitude column 318, a station longitude column 320, etc.

Referring again to FIG. 2A, in an operation 202, a second indicator may be received that indicates response variable y in FDOE dataset 124. For example, the second indicator may indicate a column number or a column name for the response variable y. As another option, a first or a last column of FDOE dataset 124 may be assumed to be the response variable y column.

In an operation 204, a second indicator may be received that indicates the explanatory variable y. For example, the second indicator may indicate a column number or a column name for the explanatory variable x.

In an operation 206, a fourth indicator may be received that indicates group variable g in FDOE dataset 124. For example, the fourth indicator may indicate a column number or a column name for group variable g.

In an operation 208, a fifth indicator may be received that indicates zero or more factor variables f in FDOE dataset 124. For example, the fifth indicator may indicate a column number or a column name for each of the zero or more factor variables f.

Figure 4:
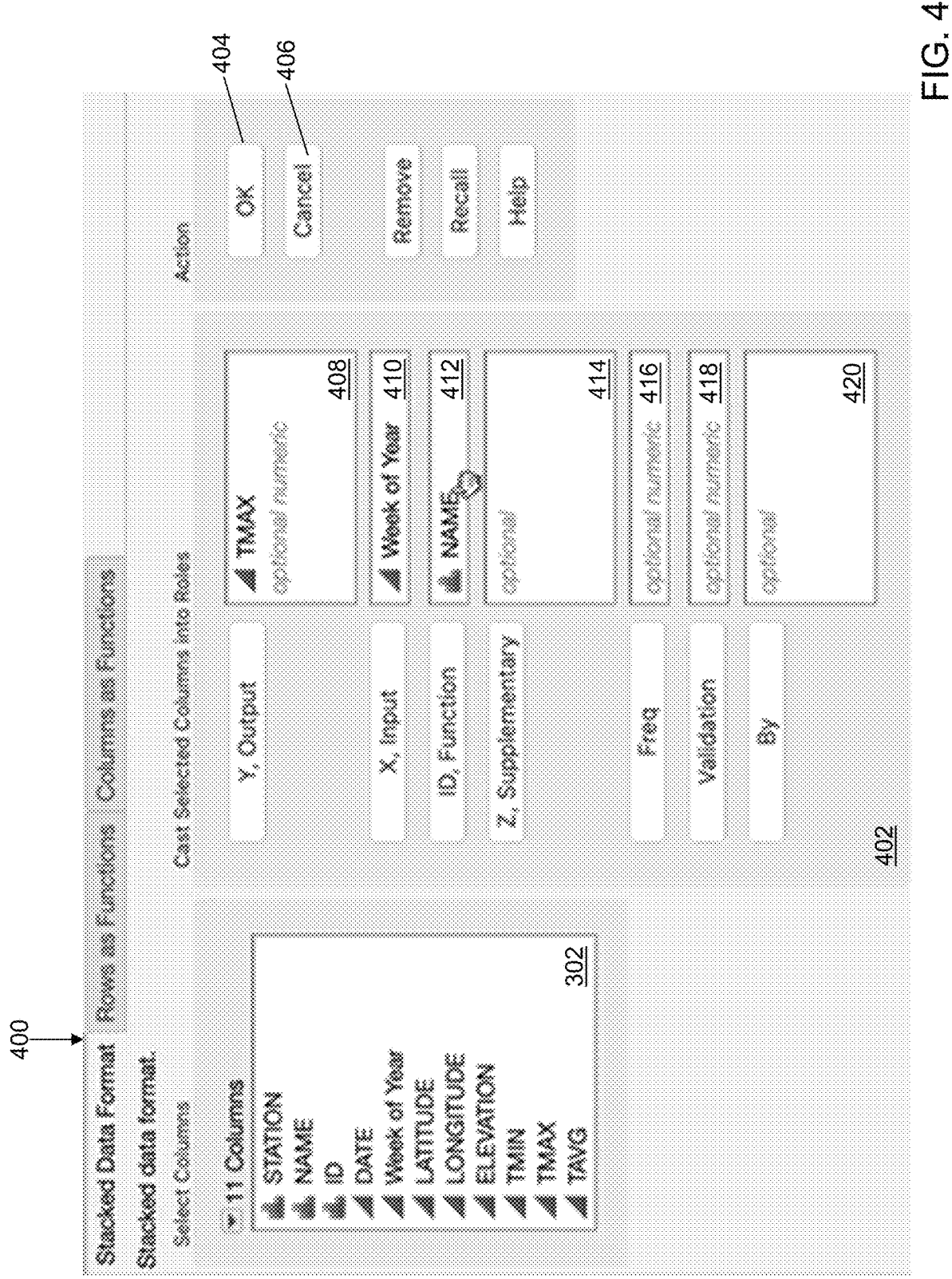
FIG. 4 show a user interface supported by the model selection application of FIGS. 2A and 2B and used to present an input window in accordance with an illustrative embodiment.

For illustration, referring to FIG. 4, an input window 400 is shown in accordance with an illustrative embodiment. Input window 400 may include variable list 302, a role selection section 402, an ok selector 404, and a cancel selector 406. Role selection section 402 of input window 400 can be used to select the response variable using a y-variable selector 408, to select the explanatory variable using an x-variable selector 410, to select group variable g using a group variable selector 412 also indicated as a function variable, and to select the zero or more factor variables f using f-variable selector 414.

In the illustrative embodiment, y-variable selector 408 has been used to define the second indicator as having the column name "TMAX" from the weekly weather data, x-variable selector 410 has been used to define the second indicator as having the column name "Week of Year" of week of the year column 316 of the weekly weather data, and group variable selector 412 further has been used to define the second indicator as having the column name "NAME" of station name column 310 of the weekly weather data for group variable g. Group variable g can be used to identify if there is more than one function in FDOE dataset 124. For example, a distinct function may be defined for each experiment included in FDOE dataset 124, which for the weekly weather data is associated with a weather station.

Role selection section 402 of input window 400 may further include a frequency selector 416, a validation selector 418, and a filter selector 420. Frequency selector 416 indicates a column name of a column whose numeric values assign a frequency to each row in FDOE dataset 124. Validation selector 418 indicates a column name of a column used to indicate whether each row of FDOE dataset 124 is part of a training dataset used in the model fit, or if it is used for validating the model. Filter selector 420 indicates a column name of a column whose levels define separate analyses.

Selection of cancel selector 406 clears any user selection in role selection window 402 and may close or collapse input window 400. Selection of ok selector 404 saves the current user selections in role selection window 402, collapses, and automatically generates a graph of the results.

Referring again to FIG. 2A, in an operation 210, a sixth indicator of a maximum number of eigenfunctions to define $N_x$ may be received. In an alternative embodiment, the sixth indicator may not be received. For example, a default value may be stored, for example, in computer-readable medium 108 and used automatically. In another alternative embodiment, the value of the maximum number of eigenfunctions $N_x$ may not be selectable. Instead, a fixed, predefined value may be used. For illustration, a default value of the maximum number of eigenfunctions $N_x$ may be 20 though other values may be used.

In an operation 212, a seventh indicator of an eigenfunctions complete value $\tau$ may be received. Eigenfunctions complete value $\tau$ defines a remaining cumulative percent of explanation not explained by the currently defined eigenfunctions. In an alternative embodiment, the seventh indicator may not be received. For example, a default value may be stored, for example, in computer-readable medium 108 and used automatically. In another alternative embodiment, the value of the eigenfunctions complete value $\tau$ may not be selectable. Instead, a fixed, predefined value may be used. For illustration, a default value of the eigenfunctions complete value $\tau$ may be 1e-12 though other values may be used.

In an operation 214, a group index i may be initialized. For example, group index i may be initialized using i=1 to indicate a first unique group variable value.

In an operation 216, a next unique group variable value is selected that is associated with group index i. For example, an array may be defined that includes each unique value of group variable g read from FDOE dataset 124. A number of entries of the array indicates a number of the unique values of group variable g denoted $N_g$ read from FDOE dataset 124. For illustration, a first weather station stored in the array may be selected on a first iteration of operation 216 when FDOE dataset 124 is the weekly weather data; a second weather station stored in the array may be selected on a second iteration of operation 216; and so on.

In an operation 218, the explanatory variable values having the selected next unique group variable value for group variable g are selected and an explanatory variable value is defined for any missing value. For example, linear interpolation between a previous explanatory variable value and a subsequent explanatory variable value may be used to define a missing explanatory variable value.

In an operation 220, the explanatory variable values having the selected next unique group variable value for group variable g are sorted in increasing order with their respective response variable values.

In an operation 222, the response variable values are stored in a row of a data matrix M defined by group index i in the order defined based on the sorted explanatory variable values. Each row is ensured to have the same length using interpolation, if needed.

In an operation 224, a determination is made concerning whether there is another group variable value to select. When there is another group variable value to select, processing continues in an operation 226. When all of the unique group variable values have been processed, processing continues in an operation 228. For example, when the group index i is equal to $N_g$, all of the unique group variable values have been processed. When $i < N_g$, there is another group variable value to select.

In operation 226, the group index i is incremented, for example, using i=i+1, and processing continues in operation 216 to select a next unique group variable value to process.

In operation 228, a mean value μ is computed for each column of data matrix M from the data stored in the respective column of data matrix M, for example using, $$\mu_j = \frac{1}{N_g}\sum_{i=1}^{N_g} M_{i,j}, j = 1, \ldots, N.$$

In an operation 230, the mean value computed for each column of data matrix M is subtracted from each response variable value included in a respective column of data. For example, $M_{i,j}=M_{i,j}-\mu_j$, i=1, . . . , $N_g$, j=1, . . . , N.

In an operation 232, an eigenfunction index k may be initialized, and processing continues in an operation 234 shown referring to FIG. 2B. For example, eigenfunction index k may be initialized using k=0.

Referring to FIG. 2B, in operation 234, the eigenfunction index k is incremented, for example, using k=k+1.

In an operation 236, a $k^{th}$ eigenfunction $e_k$ or principal component vector is computed using direct FPCA. An eigenfunction of a linear operator D defined on some function space is any non-zero function F in that space that, when acted upon by D, is only multiplied by some scaling factor called an eigenvalue. Where D is defined on a function space, the eigenvectors are referred to as eigenfunctions. For illustration, the direct FPCA computation may be based on that described in a paper by Rasmus Munk Larsen, *Lanczos bidiagonalization with partial reorthogonalization*, DAIMI Report Series, 27(537) (1998) as summarized in a presentation by Rasmus Munk Larsen, *Combining implicit restarts and partial reorthogonalization in Lanczos bidiagonalization*, presented at the University of California at Berkeley in April 2001.

In an operation 238, the $k^{th}$ eigenfunction $e_k$ is normalized to define a $k^{th}$ normalized eigenfunction $e_{k,n1}$ using $e_{k,n1}=e_k/\sqrt{(N-1)/N}$, where N is a number of columns of data matrix M that is also a number of observation vectors defined for each value of the group variable g.

In an operation 240, the $k^{th}$ normalized eigenfunction $e_{k,n1}$ is smoothed to define a $k^{th}$ smoothed eigenfunction $e_{k,s}$ using a smoothing function such as a b-spline though other basis functions may be used such as a p-spline, a Fourier basis, a power basis, an exponential basis, etc. that may or may not be selectable by the user.

In an operation 242, the $k^{th}$ smoothed eigenfunction $e_{k,s}$ is normalized again to define a second $k^{th}$ normalized eigenfunction $e_{k,n2}$ to have a unit norm using $$e_{k,n2}[i] = \frac{e_{k,s}[i]}{\sqrt{e_{k,s}^\tau e_{k,s}}}, i = 1, \ldots, N,$$

where τ indicates a transpose.

In an operation 244, a determination is made concerning whether k>1. When k>1, processing continues in an operation 246. When k=1, processing continues in an operation 248.

In operation 246, the second $k^{th}$ normalized eigenfunction $e_{k,n2}$ is orthogonalized to the previous k−1 eigenfunctions using factor $$e_{k,o}[i] = e_{k,n2}[i] * \left(1 - \frac{e_{l,n2}^\tau e_{k,n2}}{e_{l,n2}^\tau e_{l,n2}}\right) i = 1, \ldots, N, l = 1, \ldots, k-1$$

to define a $k^{th}$ orthogonalized eigenfunction $e_{k,o}$.

In operation 248, a functional principal component (FPC) score is computed for each group variable g using $FPC_i=M_i^\tau e_{k,o}$, i=1, . . . , $N_g$, where $M_i$ is an $i^{th}$ row of data matrix M associated with the $i^{th}$ group variable value.

In an operation 250, a variation due to the $k^{th}$ orthogonalized eigenfunction $e_{k,o}$ is subtracted from data matrix M using $M_{i,j}=M_{i,j}-FPC_i \times e_{k,o}[i]$, i=1, . . . , $N_g$, j=1, . . . , N, where x indicates a cross product.

In an operation 252, a determination is made concerning whether the processing of eigenfunctions is done. For example, the processing of eigenfunctions is done when k>$N_x$ or when a remaining variance value Δ is less than or equal to the eigenfunctions complete value τ. When k>$N_x$ or Δ≤τ, processing continues in an operation 254. Otherwise, processing continues in operation 234 to compute a next eigenfunction.

Figure 5:
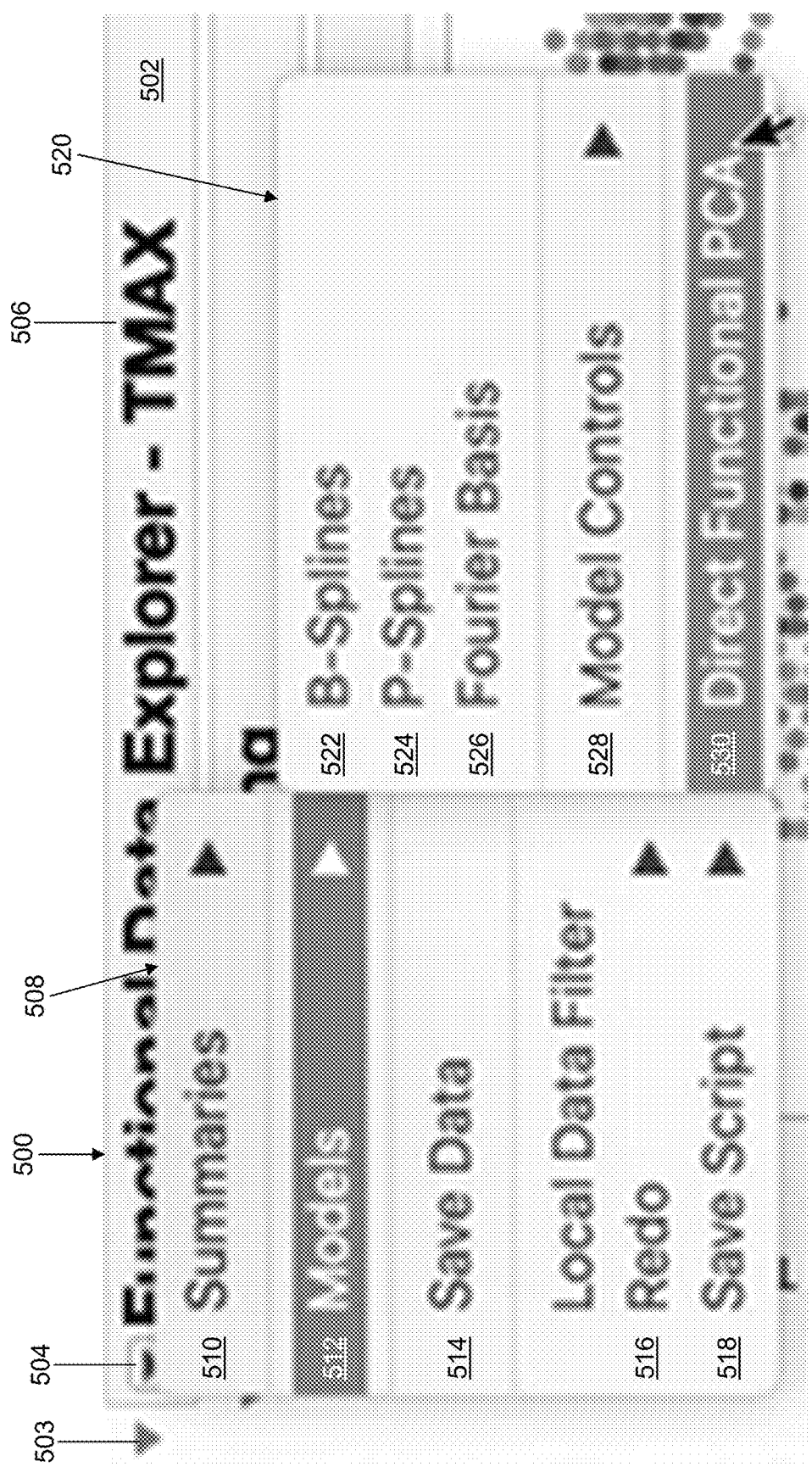
FIG. 5 show a user interface supported by the model selection application of FIGS. 2A and 2B and used to present a data explorer window in accordance with an illustrative embodiment.

Computation of the eigenfunctions using direct FPCA may be triggered by a user. For example, referring to FIG. 5, a data explorer window 500 may include a hierarchy of sub-windows that changes as selections are made from selectors presented in data explorer window 500. Data explorer window 500 may include a data explorer header bar 502. The hierarchy of sub-windows descend hierarchically from data explorer header bar 502 because they are associated with a functional data exploration of FDOE dataset 124. Data explorer header bar 502 may include an open/close sub-window selector 503, an open/close menu selector 504, and a header title 506. In the illustrative embodiment of FIG. 5, header title 508 states "Functional Data Explorer—

TMAX" that indicates functional data exploration of the response variable "TMAX" selected using y-variable selector 408. Successive selection of open/close sub-window selector 503 toggles between opening and closing the hierarchy of sub-windows associated with functional data exploration of the response variable "TMAX". When toggled closed, open/close sub-window selector 503 may appear as a forward arrow in contrast to the down arrow shown in the illustrative embodiment. Open/close menu selector 504 toggles between showing and not showing a menu of selections associated with data explorer window 500. Text to the right of open/close menu selector 504 defines header title 506 that summarizes a content of data explorer window 500.

Though not labeled for simplicity, each sub-window of data explorer window 500 may include a respective open/close sub-window selector 503, open/close menu selector 504, and header title 506. An indentation level of each sub-window included in the hierarchy of sub-windows may indicate a child and/or sibling relationship between the hierarchy of sub-windows that are all child windows of data explorer window 500. Again, based on selections in open/close menu selector 504 associated with data explorer window 500 and each sub-window of data explorer window 500, the child windows of the hierarchy of sub-windows may change.

After selection of open/close menu selector 504 of data explorer window 500, an options menu 508 may be presented in display 116 in accordance with an illustrative embodiment. Options menu 508 may include a summaries selector 510, a models selector 512, a save data selector 514, a redo selector 516, and a save script selector 518. A forward arrow associated with any of the selectors of options menu 508 may indicate that selection of the respective selector results in a sub-menu of options menu 508. Selection of the forward arrow of summaries selector 510 presents selectors related to presentation of information related to a summary of the data read from FDOE dataset 124.

Selection of the forward arrow of models selector 512 presents selectors related to a model selection. For example, selection of the forward arrow associated with models selector 512 may result in presentation of a model sub-window 520 that may include a b-splines selector 522, a p-splines selector 524, a Fourier basis selector 526, a model controls selector 528, and a direct FPCA selector 530. A greater or a fewer number of basis models may be included in model sub-window 520 in alternative embodiments. Selection of any of b-splines selector 522, p-splines selector 524, and Fourier basis selector 526 may result in computation of the associated basis function using default values or other values modified by the user using model controls selector 528. Selection of direct FPCA selector 530 may result in computation of the direction FPCA that trigger execution of operations 210 through 252 using the variables selected using input window 400.

Figure 6:
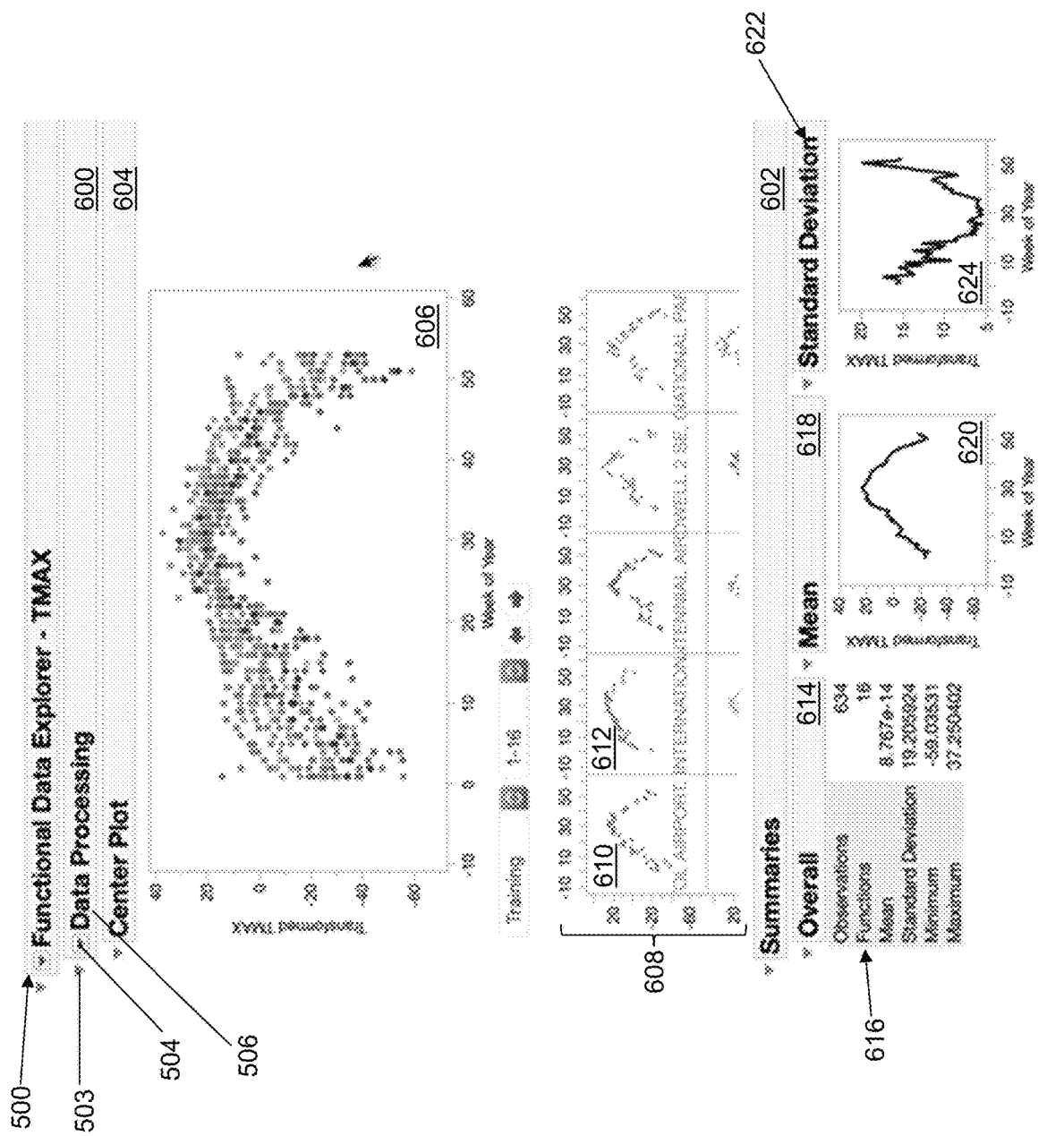
FIG. 6 show a user interface supported by the model selection application of FIGS. 2A and 2B and used to present a data processing sub-window in accordance with an illustrative embodiment.

Referring to FIG. 6, the hierarchy of sub-windows may include a data processing sub-window 600 and a summaries sub-window 602. Data processing sub-window 600 may include a data plot sub-window 604 that is a child window of data processing sub-window 600. Because data processing sub-window 600 includes a menu of options, data processing sub-window 600 includes open/close sub-window selector 503, open/close menu selector 504, and header title 506.

Data plot sub-window 604 may include a response graph 606 and a plurality of experiment response graphs 608. The plurality of experiment response graphs 608 includes an experiment response graph for each value of the group variable g in FDOE dataset 124 selected using group variable selector 412. For example, a first experiment response graph 610 shows the response graph that results for a first value of the group variable g in FDOE dataset 124, and a second experiment response graph 612 shows the response graph that results for a second value of the group variable g in FDOE dataset 124. Response graph 606 includes a graph of response variable y selected using y-variable selector 408 as a function of the explanatory variable x selected using x-variable selector 410. Response graph 606 includes a curve plotted for each value of the group variable g in FDOE dataset 124 selected using group variable selector 412. Each curve may be shown using a different color, symbol, line type, etc. or otherwise labeled to distinguish each value of the group variable g.

Summaries sub-window 602 of data explorer window 500 may include summary statistics sub-window 614, a functional mean graph sub-window 618, and a functional standard deviation graph sub-window 622. Summary statistics sub-window 614 may include a summary statistics table 616 that may include a number of observation vectors in FDOE dataset 124, a number of values of the group variable g in FDOE dataset 124, a mean value, a standard deviation value, a minimum value, a maximum value, etc. Functional mean graph sub-window 618 may include a functional mean graph 620 that shows a mean value computed for response variable y selected using y-variable selector 408 as a function of the explanatory variable x selected using x-variable selector 410. As described in operation 228, the mean value computed for response variable y as a function of the explanatory variable x is shown in functional mean graph 620 and is subtracted as described in operation 230 to center the data in data matrix M. Functional standard deviation graph sub-window 622 may include a functional standard deviation graph 624 that shows a standard deviation value computed for response variable y selected using y-variable selector 408 as a function of the explanatory variable x selected using x-variable selector 410.

Selection of save data selector 514 saves processed data read from FDOE dataset 124, for example, to a new data table. For example, though not shown, data read from FDOE dataset 124 may be processed before creating response graph 606 to remove zeroes, delete values, filter values, transform the data, etc. Selection of the forward arrow of redo selector 516 presents selectors related to repeating or relaunching an analysis. Selection of the forward arrow of save script selector 518 presents selectors related to saving a script that can reproduce response graph 606.

Figure 7A:
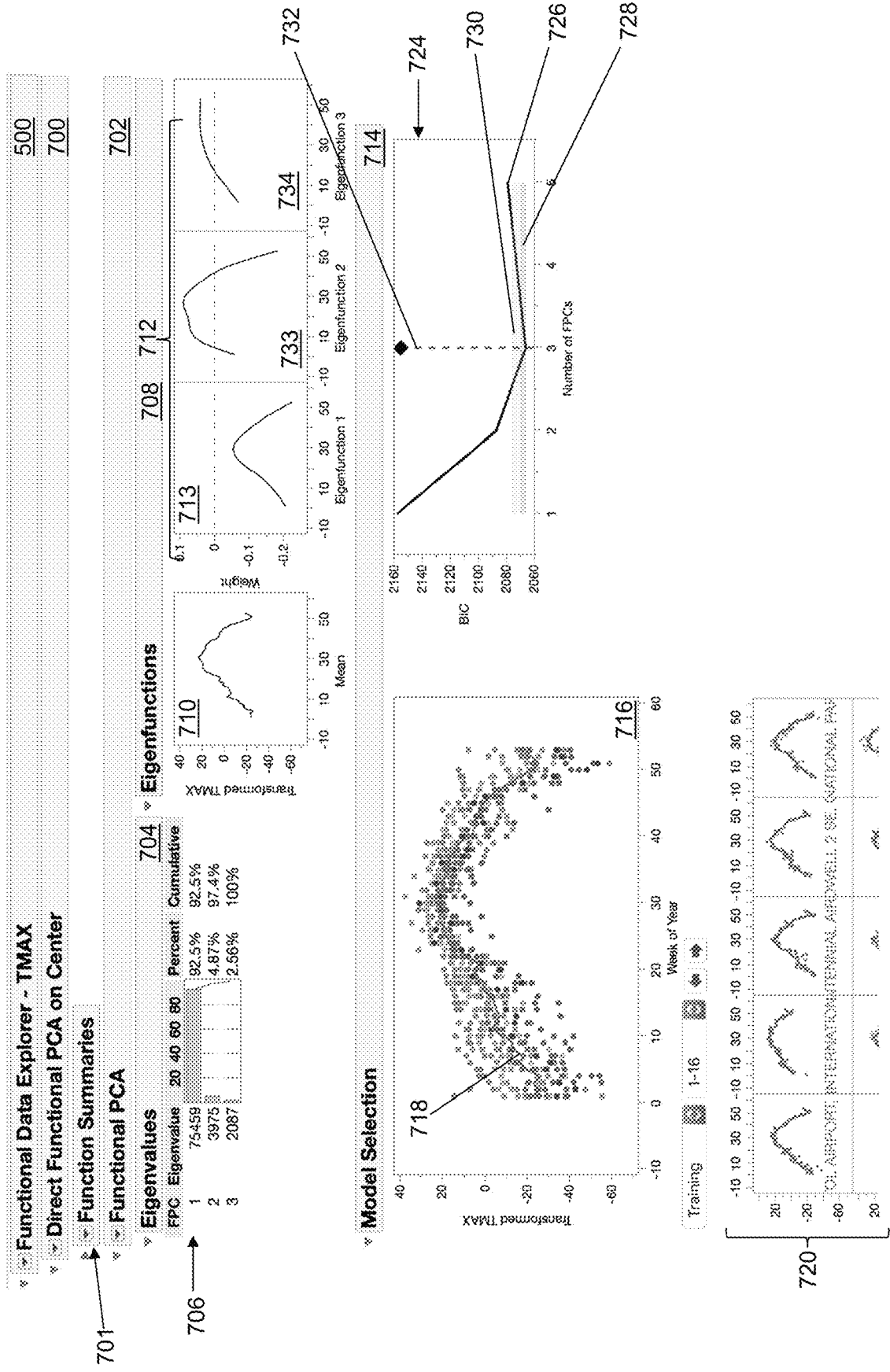
FIGS. 7A through 7C show a user interface supported by the model selection application of FIGS. 2A and 2B and used to present a direct functional principal component (FPCA) sub-window in accordance with an illustrative embodiment.

Referring to FIG. 7A, in response to selection of direct FPCA selector 530, a direct FPCA sub-window 700 is shown in accordance with an illustrative embodiment. Weather station data selected from the illustrative dataset of FIG. 3 based on the variables selected from input window 400 were used to generate the illustrative results. FIG. FPCA sub-window 700 may include a function summaries sub-window 701 and an FPCA sub-window 702. FPCA sub-window 702 may include an eigenvalues sub-window 704, an eigenfunctions sub-window 708, and a model selection sub-window 714. Eigenvalues sub-window 704 may include eigenvalue table 706. Eigenfunctions sub-window 708 may include a mean fit response graph 710, one or more eigenfunction graphs 712, and a score sub-window (not shown).

A number of the one or more eigenfunction graphs 712 is based on a number of eigenvalues listed in eigenvalue table 706. For example, a first eigenfunction graph 713 of the one or more eigenfunction graphs 712 shows a line plot of a first eigenfunction as a function of response variable y. A number of eigenvalues may be selected by the user, for example, using the maximum number of eigenfunctions to define $N_x$ indicated in operation 210 and/or eigenfunctions complete value τ indicated in operation 212.

The score sub-window may include a principal component graph that plots functional principal component (FPC) scores. When there are more than two FPCs, the user can select different FPCs to include in the principal component graph. The principal component graph can be used to detect group variables that are outliers from the other group variables.

Model selection sub-window 714 may include response graph 606 replaced with a second response graph 716 and plurality of experiment response graphs 608 replaced with a second plurality of experiment response graphs 720. Second response graph 716 includes the scatterplot of response graph 606 with a mean curve 718 as shown in functional mean graph 620 overlaying the scatter plot points. Similarly, each second plurality of experiment response graphs 718 includes a respective experiment response graph for each value of the group variable g in FDOE dataset 124 with an overlaid mean curve.

Model selection sub-window 714 may further include an FPC graph 724. FPC graph 724 shows a model selection criterion curve 726 that shows a Bayesian information criterion (BIC) value as a function of a number of functional principal components. Other criteria may be selected. FPC graph 724 may provide a first zone 728 and a second zone 873076 that are shaded, for example, using different colors to identify comparable models. Models that fall outside the zones are not recommended. First zone 728 and second zone 730 provide an interval of values of the validation statistics. First zone 728 and second zone 730 may be shown as rectangles that span the entire horizontal axis. A model falls in a zone if the value of its validation statistic falls in the zone. First zone 728 identifies models for which there is strong evidence that a model is comparable to the best model. First zone 728 may be defined as the interval [Vbest, Vbest+4]. Second zone 730 identifies models for which there is weak evidence that a model is comparable to the best model. Second zone 730 may be defined as the interval (Vbest+4, Vbest+10].

Model selection sub-window 714 may further include a number of FPCs adjustment line 732. Number of FPCs adjustment line 732 is initially presented in association with a best fit model based on model parameters selected for the trained prediction model. The user can drag and drop number of FPCs adjustment line 732 to explore how the prediction model results change as the number of FPCs changes. Movement of number of FPCs adjustment line 732 changes the number of eigenfunctions included in eigenvalue table 706 and the number of eigenfunction graphs included in the one or more eigenfunction graphs 712.

Figure 7B:
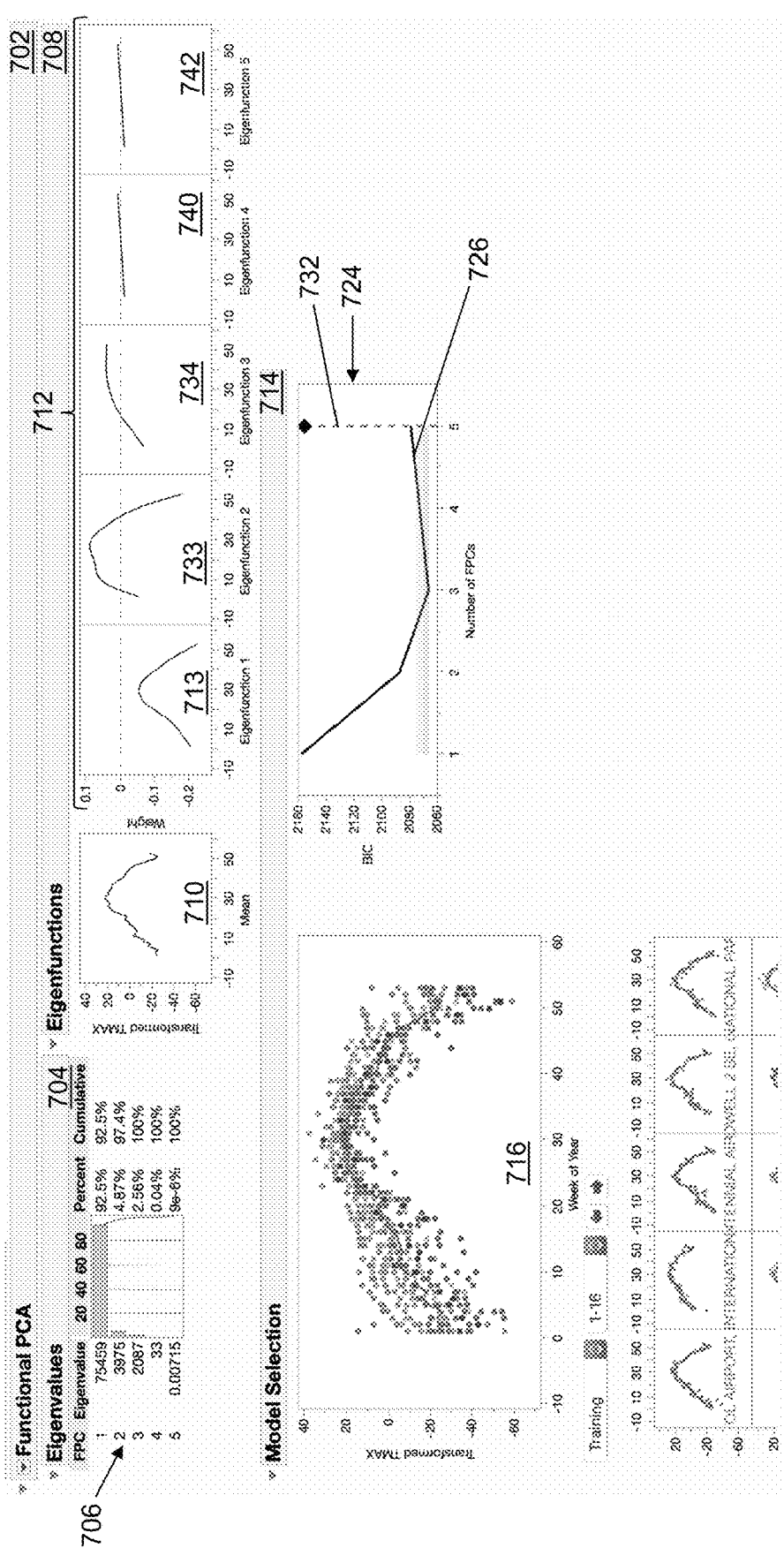

For example, referring to FIG. 7B, a number of the one or more eigenfunction graphs 712 has been changed from one to four by sliding number of FPCs adjustment line 732 to the right. Eigenvalue table 706 now includes eigenvalues for the first four eigenfunctions and the one or more eigenfunction graphs 712 includes first eigenfunction graph 713, a second eigenfunction graph 740, a third eigenfunction graph 742, and a fourth eigenfunction graph 744. Second eigenfunction graph 740 shows a line plot of a second eigenfunction as a function of response variable y. Third eigenfunction graph 742 shows a line plot of a third eigenfunction as a function of response variable y. Fourth eigenfunction graph 744 shows a line plot of a fourth eigenfunction as a function of response variable y.

Figure 7C:
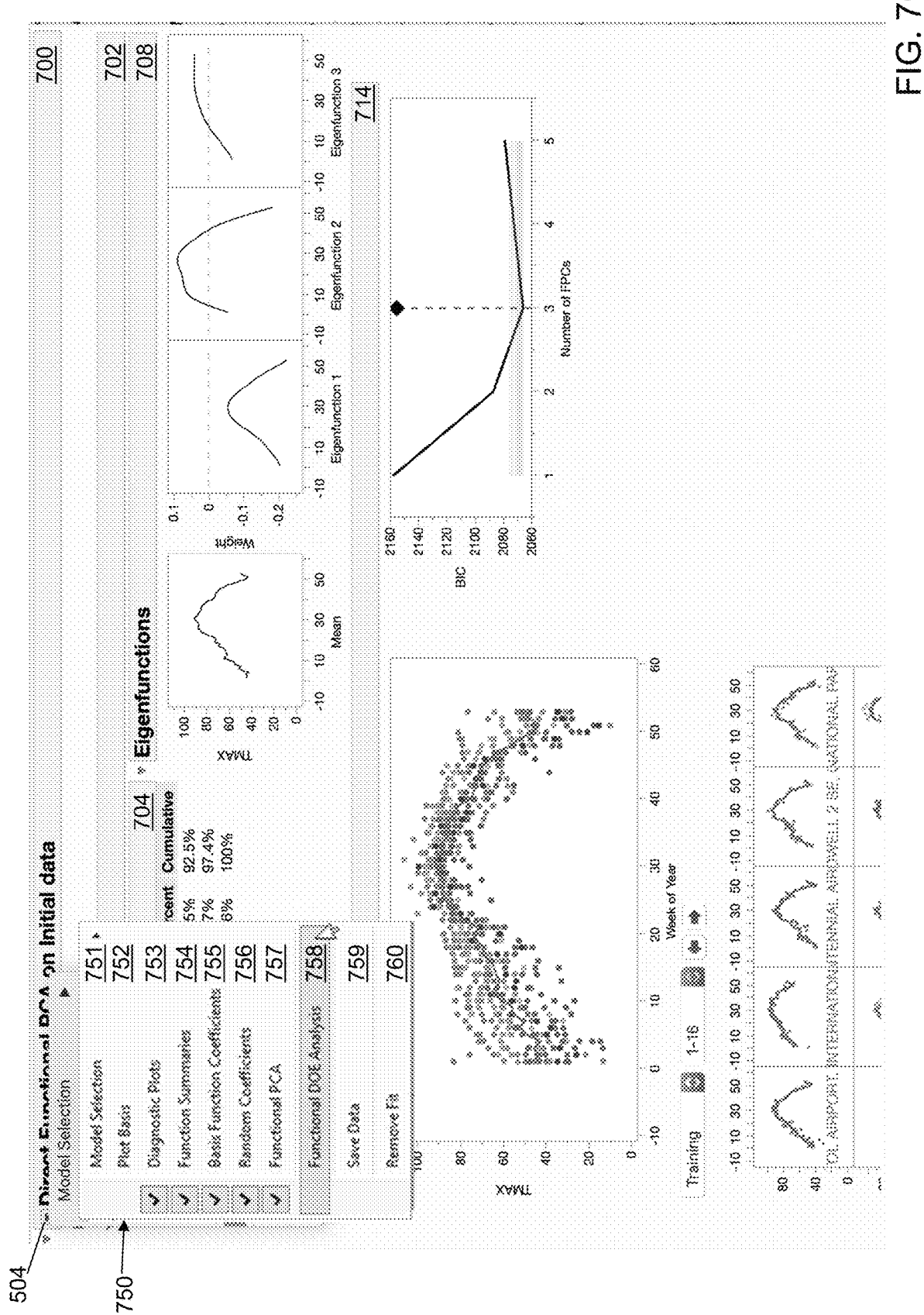

Referring again to FIG. 2B, in an operation 256, an indicator of a user request to perform FDOE is received. For illustration, referring to FIG. 7C, after selecting open/close menu selector 504 of FPCA sub-window 700, a fit options menu 750 is presented. Fit options menu 750 may include a model selection selector 751, a basis plot selector 752, a diagnostic plot selector 753, a function summary selector 754, a basis function coefficients selector 755, a random coefficients selector 756, an FPCA selector 757, an FDOE analysis selector 758, a save data selector 759, and a remove fit selector 760.

Selection of the forward arrow of model selection selector 751 presents a sub-menu of choices to use as the model selection criteria. For example, the choices may include AICc, BIC, GCV, etc. Successive selection of basis plot selector 752 toggles between showing or hiding a plot of all the basis functions on one graph. Successive selection of diagnostic plot selector 753 toggles between showing or hiding a diagnostic plot sub-window. Successive selection of function summary selector 754 toggles between showing or hiding a function summaries sub-window. Successive selection of basis function coefficients selector 755 toggles between showing or hiding a basis function coefficients sub-window. Successive selection of random coefficients selector 756 toggles between showing or hiding a random coefficients sub-window. Successive selection of FPCA selector 757 toggles between showing or hiding a FPCA sub-window 700. Selection of save data selector 759 saves the modeled data to a new data table. Selection of remove fit selector 760 removes any data fit. Selection of FDOE analysis selector 758 triggers an indicator of a user request to perform FDOE.

Referring again to FIG. 2B, in an operation 258, a prediction model is trained using the FPC scores for each FPC as a function of the one or more factor variables f selected in operation 208. For example, a generalized regression model is fit to each of the FPC score functions using the one or more factor variables f as model effects. Modeling the FPC scores using the one or more factor variables f supports use of the model fit to determine how a response of response variable y changes based on the one or more factor variables f. By default, a two-degree factorial model may be fit using an estimation method of best subset. Alternatively, a model script can be specified, for example, in a data table that defines a desired model fit. Other models may be used such as a neural network model.

In an operation 260, a prediction model execution result computed using the trained prediction model is presented for each FPC. For example, selection of FDOE analysis selector 758 triggers creation of a model analysis within data explorer window 500. For illustration, referring to FIGS. 8A to 8G, the hierarchy of sub-windows is updated based on user selection of FDOE analysis selector 758. FIGS. 8A to 8G show the interface for interacting with the models of the FPC scores (FIG. 8A), associated diagnostic plots for the model fits (FIG. 8B), a profiler for the user to interact with the model fit to understand how their factor variables A, B, C impact the shape of the function (FIG. 8C), alternative modeling options for the FPC scores (FIGS. 8D and 8E), and model selection options for each of the FPC score models (FIGS. 8F and 8G).

Figure 8A:
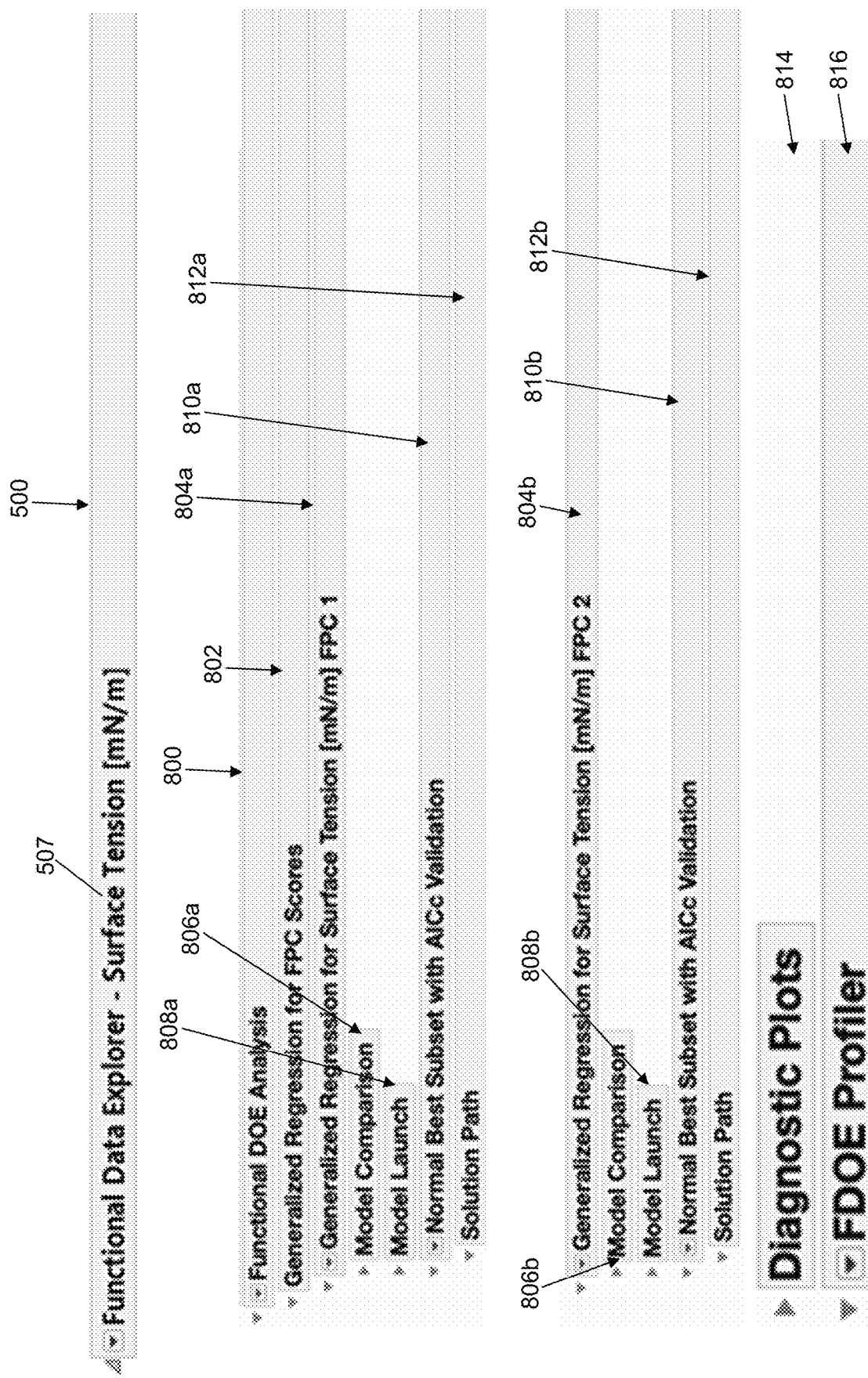
FIGS. 8A through 8G show a user interface supported by the model selection application of FIGS. 2A and 2B and used to present a functional analysis sub-window in accordance with an illustrative embodiment.

Referring to FIG. 8A, the updated hierarchy of sub-windows may include a functional DOE analysis sub-window 800, an FPC score model sub-window 802, a first FPC model sub-window 804a, a first model comparison sub-window 806a, a first model launch sub-window 808a, a first model fit sub-window 810a, a first solution path sub-window 812a, a second FPC model sub-window 804b, a second model comparison sub-window 806b, a second model launch sub-window 808b, a second model fit sub-window 810b, a second solution path sub-window 812b, a diagnostic plot sub-window 814, and a profiler sub-window 816. FPC score model sub-window 802, diagnostic plot sub-window 814, and profiler sub-window 816 are sub-windows of functional DOE analysis sub-window 800. First FPC model sub-window 804a and second FPC model sub-window 804b are sub-windows of FPC score model sub-window 802. First model comparison sub-window 806a, first model launch sub-window 808a, and first model fit sub-window 810a are sub-windows of first FPC model sub-window 804a. First solution path sub-window 812a is a sub-window of first model fit sub-window 810a. Second model comparison sub-window 806b, second model launch sub-window 808b, and second model fit sub-window 810b are sub-windows of second FPC model sub-window 804b. Second solution path sub-window 812b is a sub-window of second model fit sub-window 810b. In the illustrative embodiments of FIG. 8A, there are two functional principle components resulting in two sets of FPC model sub-windows and their associated child sub-windows. In alternative embodiments, there may be a fewer or a greater number of FPC model sub-windows and their associated child sub-windows.

Figure 8B:
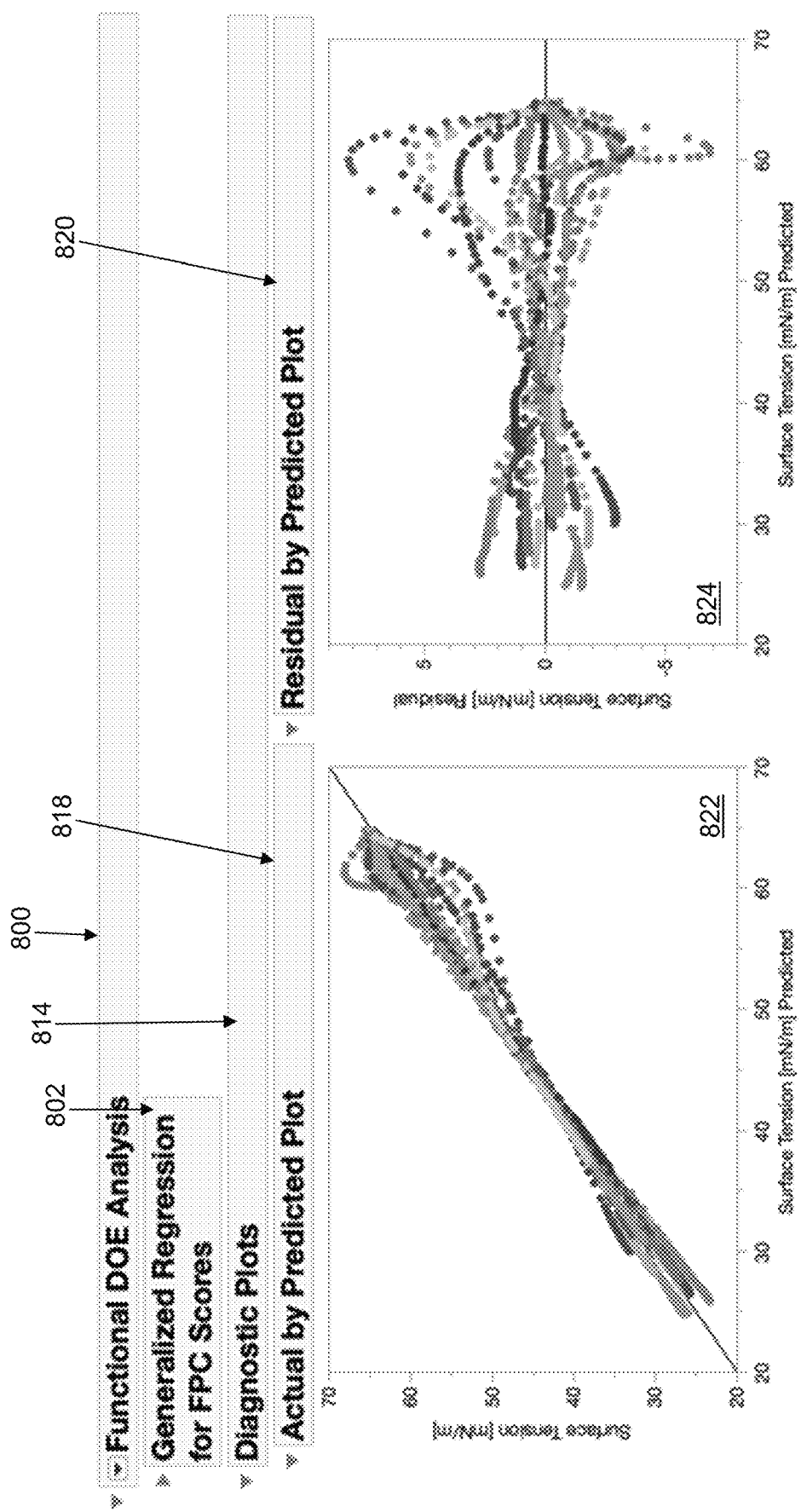

Referring to FIG. 8B, diagnostic plot sub-window 814 may include an actual prediction comparison sub-window 818 and a prediction residual comparison sub-window 820. Selection of open/close sub-window selector 503 of diagnostic plot sub-window 814 displays or hides actual prediction comparison sub-window 818 and prediction residual comparison sub-window 820. Actual prediction comparison sub-window 818 includes an actual graph 822 that shows response variable y read from FDOE dataset 124 for each value of the group variable g on a vertical axis and a predicted response variable value y for each value of the group variable g on a horizontal axis. The predicted response variable value is predicted using the generalized regression model with the observation vectors read from FDOE dataset 124 for each value of the group variable g. Actual graph 822 includes a separate curve for each value of the group variable g in FDOE dataset 124. Each curve may be shown using a different color, symbol, line type, etc. or otherwise labeled to distinguish each value of the group variable g.

Prediction residual comparison sub-window 820 includes a residual graph 824 that shows a difference between response variable y and the predicted response variable value y for each value of the group variable g on the vertical axis and the predicted response variable value y for each value of the group variable g on the horizontal axis. Residual graph 824 includes a separate curve for each value of the group variable g in FDOE dataset 124. Each curve may be shown using a different color, symbol, line type, etc. or otherwise labeled to distinguish each value of the group variable g. Actual graph 822 and residual graph 824 provide a visual evaluation of how well the generalized regression model models the observation vectors read from FDOE dataset 124 for each value of the group variable g.

Figure 8C:
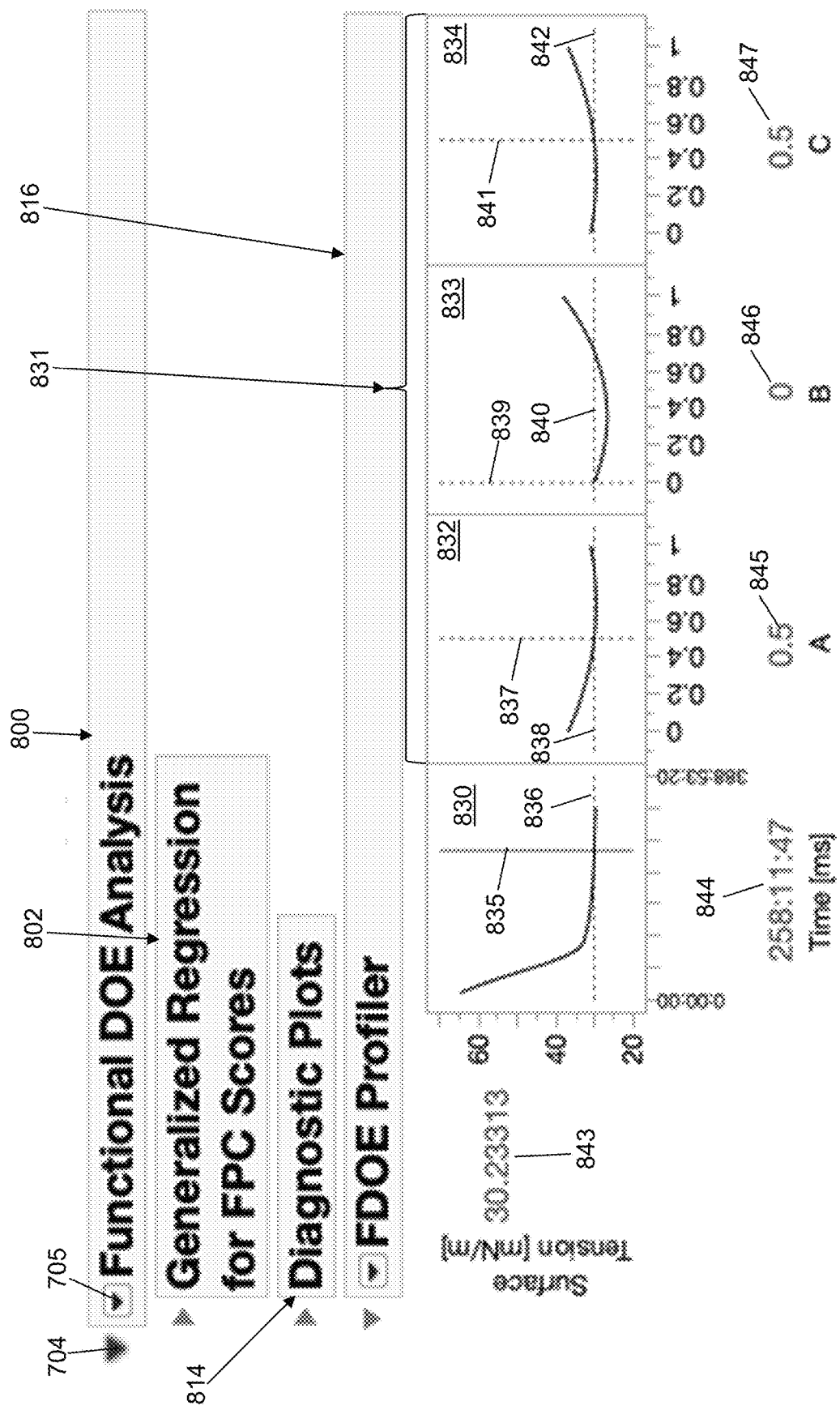

Referring to FIG. 8C, profiler sub-window 816 may include a prediction graph 830 and one or more factor profile graphs 831. The one or more factor profile graphs 831 include a profile trace for each factor variable of the one or more factor variables f to show how response variable y varies as a function of each respective factor variable. For example, in the illustrative embodiment, the three factor variables "A", "B", and "C" were selected using f-variable selector 414. A first factor profile graph 832 shows response variable y as a function of factor variable "A". A second factor profile graph 833 shows response variable y as a function of factor variable "B". A second factor profile graph 834 shows response variable y as a function of factor variable "C". Profiler sub-window 816 can be used to show how changing one factor at a time effects the predicted values of response variable y shown in a response curve of prediction graph 830.

Each of prediction graph 830 and the one or more factor profile graphs 831 present a profile based on the trained prediction model, which in the illustrative embodiment is the two-degree factorial model using an estimation method of best subset and a validation method of AICc. The curve within each of first factor profile graph 832, second factor profile graph 833, and second factor profile graph 834 show a profile trace for each the three factor variables "A", "B", and "C", respectively. A profile trace is a predicted response as one factor variable is changed while the other factor variables are held constant at their current values.

The trained prediction model can be modified by the user. For example, first model launch sub-window 808a and second model launch sub-window 808b may include model sub-windows (not shown) such as a response distribution sub-window, an estimation method sub-window, a validation method sub-window. The validation method sub-window may provide options for selecting methods available for validation of the model fit such as BIC, AICc, k-fold, etc. The user can select one of the sub-windows of first model launch sub-window 808a or second model launch sub-window 808b to change the model definition. The trained prediction model can further be modified using selectors in profiler sub-window 816 adjustment of which results in recomputing the profile traces and predicted responses and an automatic update of the information shown, for example, in prediction graph 830 and in one or more of the factor profile graphs 831.

A response vertical line 835 is presented in prediction graph 830. A first factor adjustment line 837 is presented in first factor profile graph 832, a second factor adjustment line 839 is presented in second factor profile graph 833, and a second factor adjustment line 840 is presented in second factor profile graph 834. Each adjustment line 837, 839, 841 is initially presented in association with a best fit model based on model parameters selected for the trained prediction model. The user can drag and drop any of first factor adjustment line 837, second factor adjustment line 839, or second factor adjustment line 841 to explore how the prediction model results change as the value of individual factors changes. Movement of any of first factor adjustment line 837, second factor adjustment line 839, and second factor adjustment line 841 changes the value of the respective factor. Movement of any of first factor adjustment line 837, second factor adjustment line 839, and second factor adjustment line 841 results in showing a vertical slice across each factor while holding the other factors at their current values. The prediction trace for the factor associated with the moved adjustment line 837, 839, 841 may not be affected, but the prediction trace of the other factors may change.

A response adjustment line 836 is presented in prediction graph 830, a first response adjustment line 838 is presented in first factor profile graph 832, a second response adjustment line 840 is presented in second factor profile graph 833, and a second response adjustment line 841 is presented in second factor profile graph 834. The adjustment lines 836, 838, 840, 842 are vertically aligned with each other and indicate a current predicted value of the response variable y that crosses an intersection point of the profile traces to define their current value lines. If there are interaction effects or cross-product effects in the trained prediction model, the profile trace can shift their slope and curvature as any factor value is changed. If there are no interaction effects, the traces change only in height, not slope or shape. The user may also drag and drop any of response adjustment line 836, first response adjustment line 838, second response adjustment line 840, and second response adjustment line 842 to explore how the factor values change as the current value of the response variable y changes.

The current value of the response variable y is shown by a response indicator 843. Response adjustment line 836 graphically shows the current value of the response variable y The current value of the explanatory variable x is shown by an explanatory variable indicator 844. Response vertical line 835 graphically shows the current value of the explanatory variable x.

The current value of the first factor $f_1$ is shown by a first factor indicator 845. The current value of the second factor $f_2$ is shown by a second factor indicator 846. The current value of the second factor $f_3$ is shown by a second factor indicator 847. First response adjustment line 838 graphically shows the current value of the first factor $f_1$. Second response adjustment line 840 graphically shows the current value of the second factor $f_2$. Second response adjustment line 841 graphically shows the current value of the second factor $f_3$.

Figure 8D:
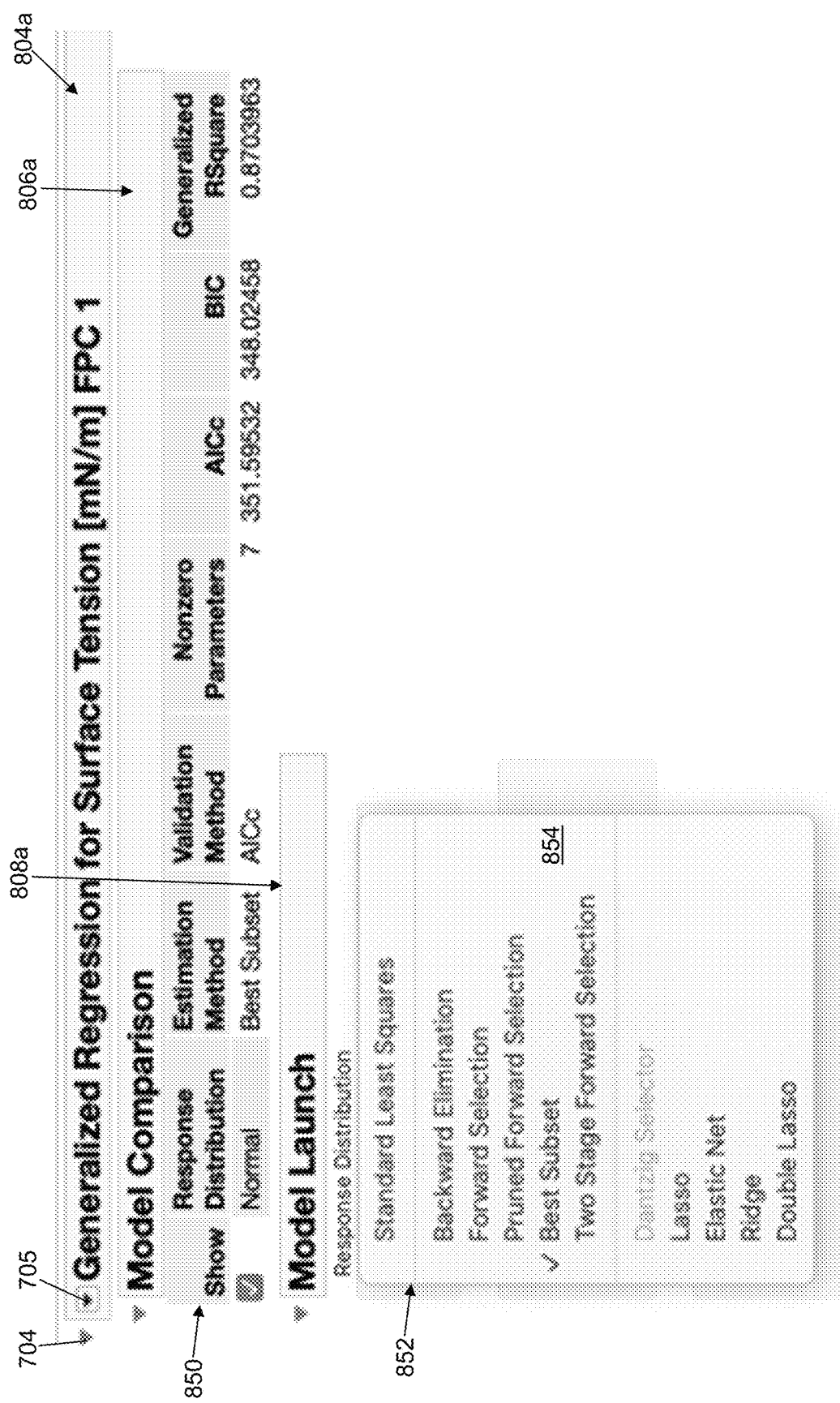

For example, referring to FIG. 8D, selection of open/close menu selector 504 of the estimation method sub-window may trigger presentation of a model menu 852 that includes a variety of modeling techniques that may be selected to model response variable Y as a function of the functional principal components computed for each value of the group variable g using the one or more factor variables f as predictors or effects. For illustration, three classes of modeling techniques may be used that include maximum likelihood, step-based estimation, and penalized regression. For example, model menu 852 may include standard least squares, backward elimination, forward selection, pruned forward selection, best subset, two-stage forward selection, Dantzig selector, Lasso, elastic net, ridge, double lasso, etc. A check mark next to a best subset selector 854 indicates the best subset estimation method is selected.

Figure 8E:
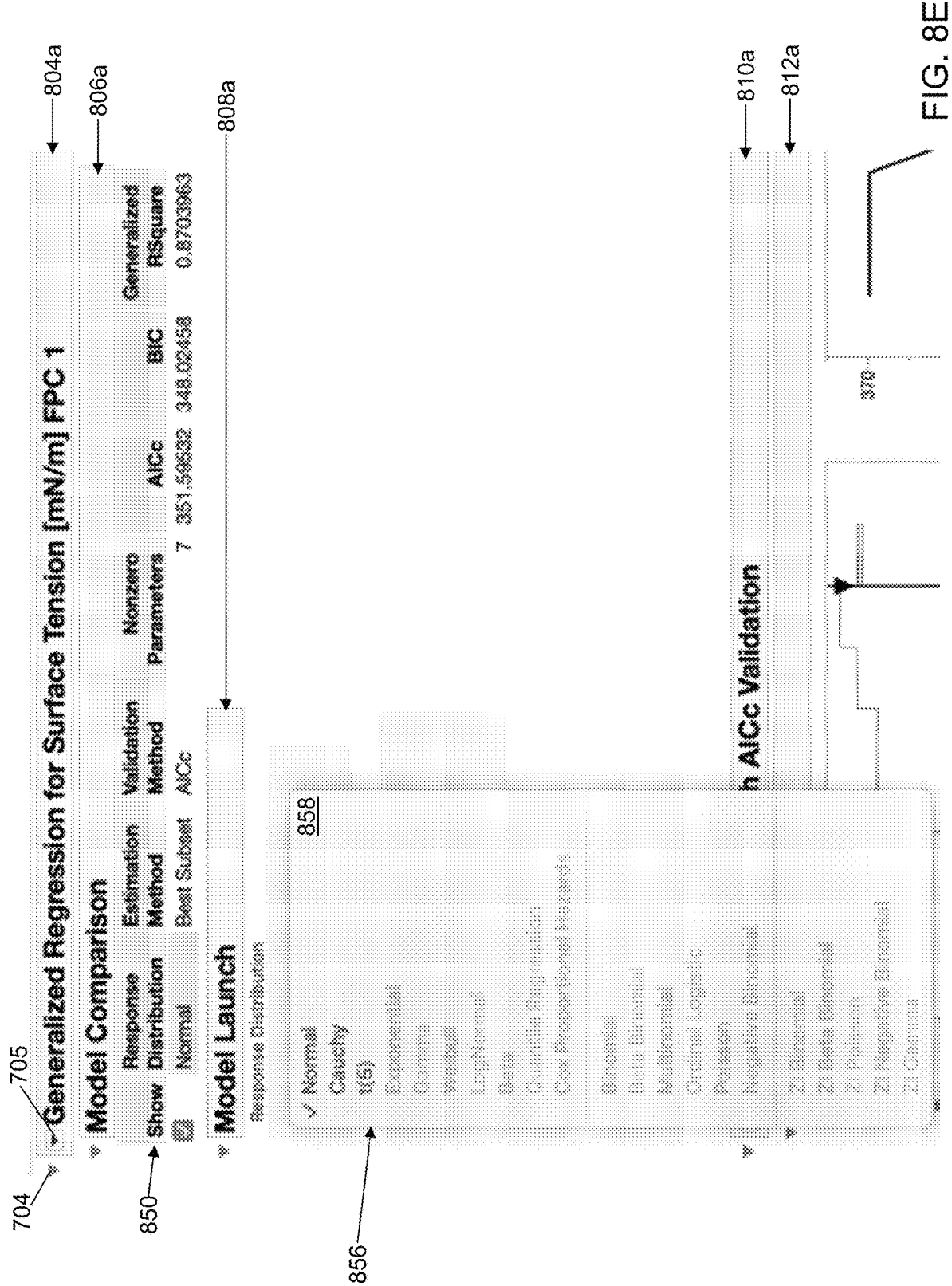
Figure 8F:
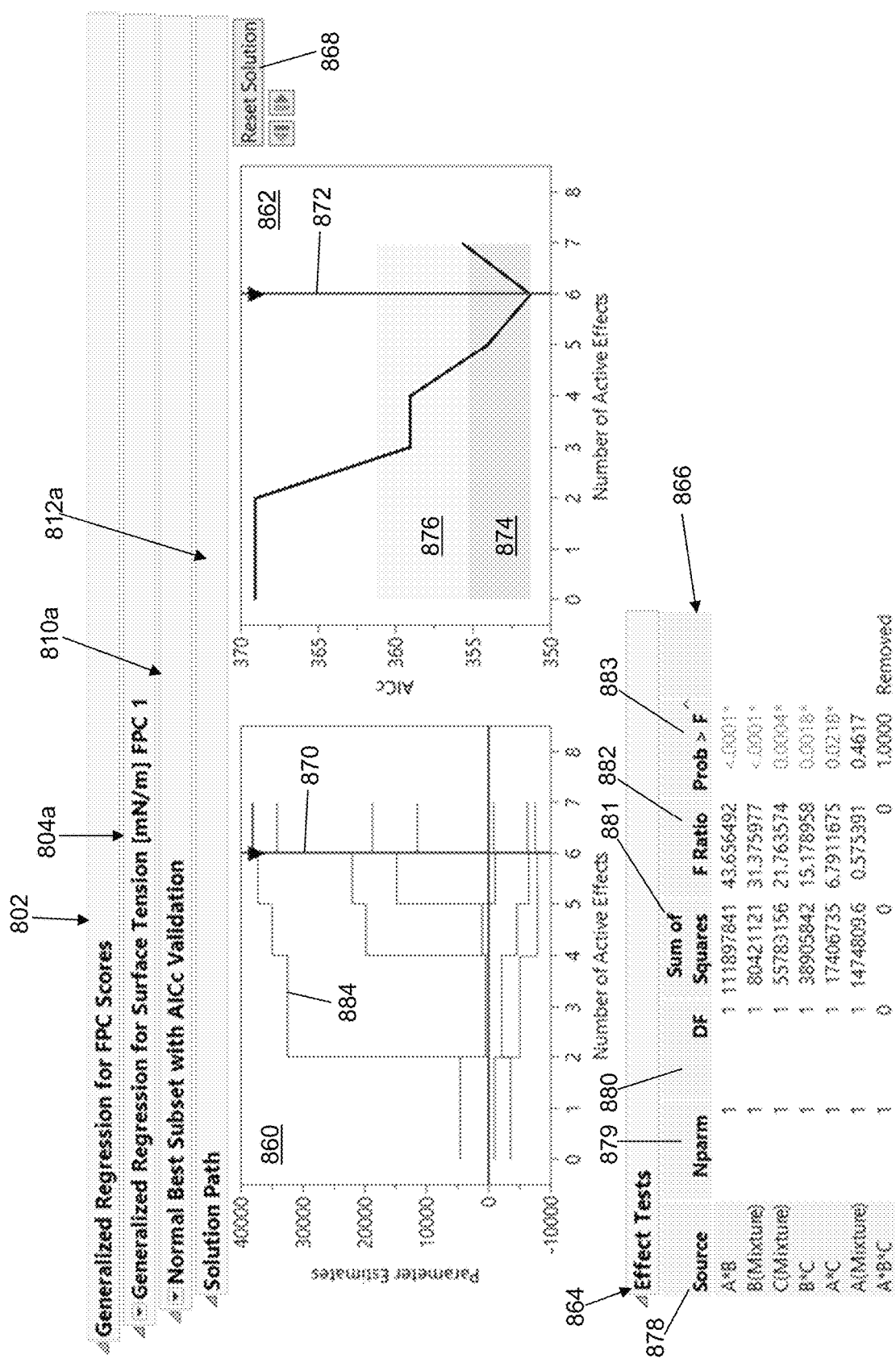
Figure 8G:
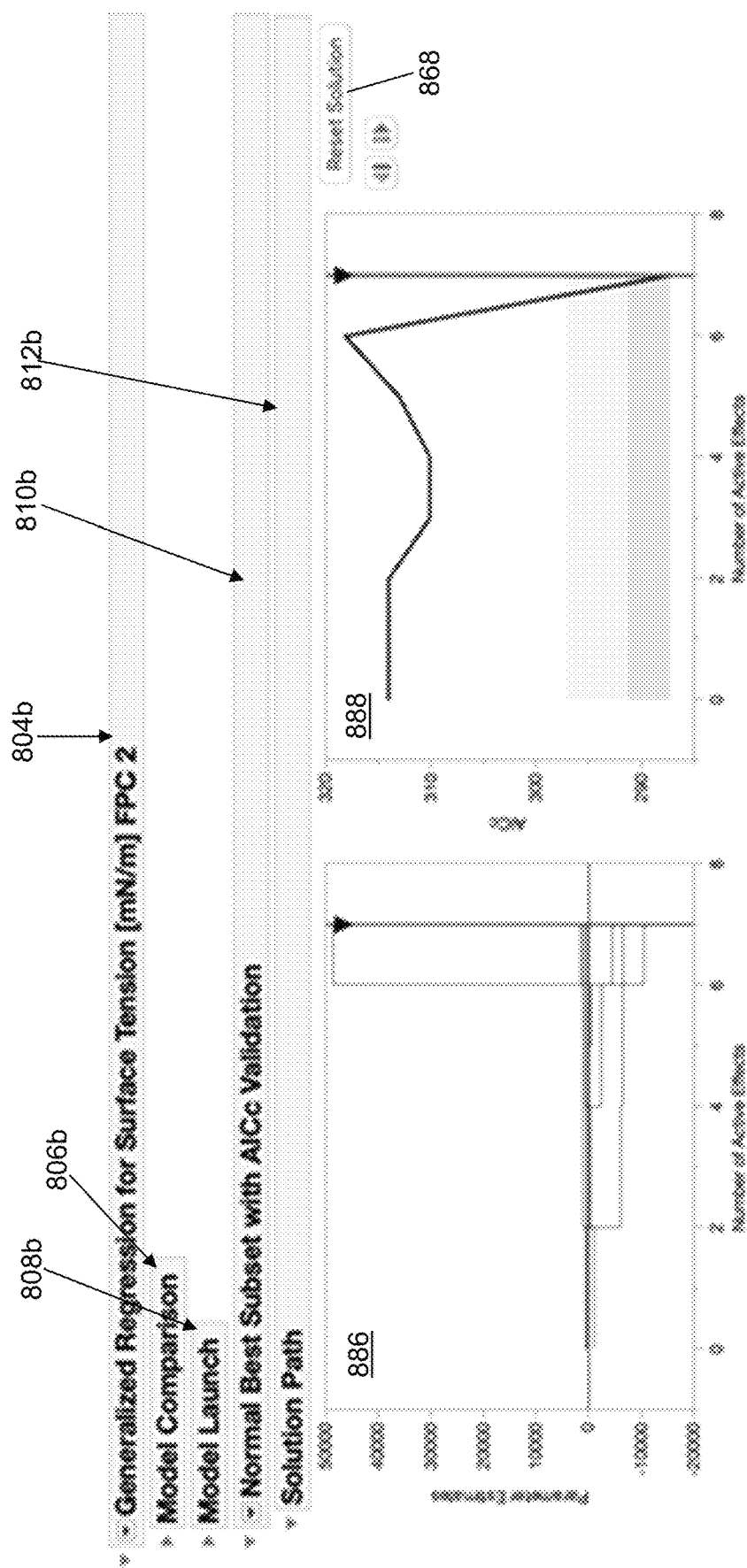

For example, referring to FIG. 8E, selection of open/close menu selector 504 of the response distribution method sub-window may trigger presentation of a distribution menu 856 that includes a variety of distributions that may be selected for response variable Y including a normal, Cauchy, t(5), exponential, gamma, Weibull, lognormal, beta, quantile regression, Cox proportional hazards models, binomial, beta binomial, multinomial, ordinal logistic, Poisson, negative binomial, zero-inflated binomial, zero-inflated beta binomial, zero-inflated Poisson, zero-inflated negative binomial, zero-inflated gamma, etc. A check mark next to a normal distribution selector 858 indicates the normal distribution function is selected. The non-grayed elements shown in model menu 852 may vary based on the distribution method selected from distribution menu 856.

Based on selections from sub-windows and/or menus associated with first FPC model sub-window 804a or second FPC model sub-window 804b, the child windows may change as well as the information presented in each. Illustrative selections are described in *Fitting Linear Models*, version 15, published by JMP, a business unit of SAS Institute Inc. of Cary, N.C., USA (September 2019).

First model comparison sub-window 806a and second model comparison sub-window 806b present information to compare the models that have been fit. Each time a new model is defined and fit based on selection of selectors/indicators from one or more of first FPC model sub-window 804a, first model launch sub-window 808a, first model fit sub-window 810a, first solution path sub-window 812a, second FPC model sub-window 804b, second model launch sub-window 808b, second model fit sub-window 810b, second solution path sub-window 812b, and profiler sub-window 816, a row is added to a model comparison table 850, and the information presented in first FPC model sub-window 804a, first model comparison sub-window 806a, first model launch sub-window 808a, first model fit sub-window 810a, first solution path sub-window 812a, second FPC model sub-window 804b, second model comparison sub-window 806b, second model launch sub-window 808b, second model fit sub-window 810b, second solution path sub-window 812b, diagnostic plot sub-window 814, and profiler sub-window 816 is updated automatically. For example, model comparison table 850 includes a single fit model that used the normal distribution, the best subset estimation method, and a validation method of AICc though other validation methods may be selected as validation methods. For example, BIC, k-fold, leave-one-out, ERIC, holdback, etc. may optionally be selectable as validation methods. Each row of model comparison table 850 can be shown or hidden using a check box in a show column. Other columns in model comparison table 850 contain information about the fit statistics for the associated model.

Referring to FIG. 8F, first solution path sub-window 812a may include a parameter estimate graph 860, a validation graph 862, and a reset solution button 868 for FPC 1. Parameter estimate graph 860 displays values of the estimated parameters for FPC 1. Validation graph 862 displays values of the validation statistic corresponding to the selected validation method for FPC 1. In the illustrative embodiment, AICc is the selected validation method. The horizontal scaling for both graphs is a number of active effects based on selection of the best subset estimation method. The best subset estimation method computes parameter estimates by increasing a number of active effects in the model at each step. In each step, the model is chosen among all possible models with a number of effects given by the step number. Step 0 corresponds to an intercept-only model. Step 1 corresponds to a best model of those that contain a single active effect. The steps continue up to a value of a maximum number of effects that may be defined by the user, for example, using a selector presented in first model launch sub-window 808a.

Validation graph 862 presents statistics that describe how well models fit across values of a tuning parameter, or equivalently, across values of a magnitude of scaled parameter estimates. The statistics plotted depend on the selected validation method though smaller values are better. For the k-fold and leave-one-out validation methods, and for a validation column with more than three values, the statistic may be a mean of a scaled negative log-likelihood values across the folds.

Although a model is estimated to be the best model, there can be uncertainty relative to this selection. Competing models may fit nearly as well and can contain useful information. For the AICc, BIC, k-fold, and leave-one-out validation methods, and for a validation column with more than three values, Validation graph 862 may provide a first zone 874 and a second zone 876 that are shaded, for example, using different colors to identify comparable models. Models that fall outside the zones are not recommended. First zone 874 and second zone 876 provide an interval of values of the validation statistics. First zone 874 and second zone 876 may be shown as rectangles that span the entire horizontal axis. A model falls in a zone if the value of its validation statistic falls in the zone. First zone 874 identifies models for which there is strong evidence that a model is comparable to the best model. First zone 874 may be defined as the interval [Vbest, Vbest+4]. Second zone 876 identifies models for which there is weak evidence that a model is comparable to the best model. Second zone 876 may be defined as the interval (Vbest+4, Vbest+10].

A parameter estimate line 870 and a validation line 872 are included on both graphs at a value of the number of active effects for the solution presented in actual graph 822. Initially, parameter estimate line 870 and a validation line 872 are shown at a location of the best model. An arrow at a top of parameter estimate line 870 or validation line 872 can be dragged and dropped to a new number of active effects to explore solutions within first zone 874 and second zone 876 which in turn changes the prediction model and the information presented in the related sub-windows first FPC model sub-window 804a, first model comparison sub-window 806a, first model launch sub-window 808a, first model fit sub-window 810a, and first solution path sub-window 812a.

A user may further click anywhere in validation graph 862 to change the prediction model. As validation line 872 is moved to indicate a new model, a dashed vertical line remains at a best fit model. Selection of reset solution button 868 returns parameter estimate line 870 and validation line 872 to the initial best fit solution and, again, the information presented in the related sub-windows is updated accordingly.

An effect tests sub-window 864 is a child window of first model fit sub-window 810a and a sibling window relative to first solution path sub-window 812a. effect tests sub-window 864 may include an effect test table 866 for FPC 1. Effect test table 866 may include a source column 878, a number of parameters column 879, a degrees of freedom column 880, a sum of squares column 881, an f-ratio column 882, and a p-value column 883. Source column 878 may include a list of effects that can be included in the prediction model. Number of parameters column 879 may include a number of parameters associated with each effect included in the list of effects. Degrees of freedom column 880 may include a degrees of freedom for a Wald chi-square test associated with each effect included in the list of effects, which is a number of nonzero parameter estimates associated with the effect in the model. Sum of squares column 881 may include a sum of squares for an hypothesis that the effect included in the list of effects is zero. F-ratio column 882 may include an f-statistic for testing that the effect included in the list of effects is zero. The f-statistic is a ratio of a mean square for the effect divided by a mean square for the error. The mean square for the effect is the sum of squares for the effect divided by its degrees of freedom. P-value column 883 may include a p-value for the effect test associated with each effect included in the list of effects.

Selection of an effects line, such as effects line 884, shown in parameter estimate graph 860 triggers a highlight of corresponding terms in effect tests sub-window 864. Selecting a row in effect tests sub-window 864 highlights a corresponding path in effect test table 866. Multiple paths or rows may be selected.

Referring to FIG. 8G, second solution path sub-window 812b may include a parameter estimate graph 886, a validation graph 888, and reset solution button 868 for FPC 2. Parameter estimate graph 886 for FPC 2 is similar to parameter estimate graph 860 for FPC 1, and validation graph 888 for FPC 2 is similar to validation graph 862 for FPC 1. Though not shown, effect tests sub-window 864 may be presented that is a child window of second model fit sub-window 810b and a sibling window relative to second solution path sub-window 812b.

Referring again to FIG. 2B, in an operation 262, a determination is made concerning whether the user has adjusted the model, for example, using a selector/indicator from one or more of first FPC model sub-window 804a, first model launch sub-window 808a, first model fit sub-window 810a, first solution path sub-window 812a, second FPC model sub-window 804b, second model launch sub-window 808b, second model fit sub-window 810b, second solution path sub-window 812b, and profiler sub-window 816. When the user has adjusted the model, processing continues in operation 258 to train a new prediction model with the new parameters and automatically update the information presented in one or more of first FPC model sub-window 804a, first model launch sub-window 808a, first model fit sub-window 810a, first solution path sub-window 812a, second FPC model sub-window 804b, second model launch sub-window 808b, second model fit sub-window 810b, second solution path sub-window 812b, and profiler sub-window 816. When the user has not adjusted the model, processing continues in an operation 264.

In operation 264, analysis information is written to and stored in FDOE analysis description 126, and processing may be stopped. Information that describes the FPCA results, and/or model trained in operation 274 may further be written to and stored in FDOE analysis description 126.

Figure 9:
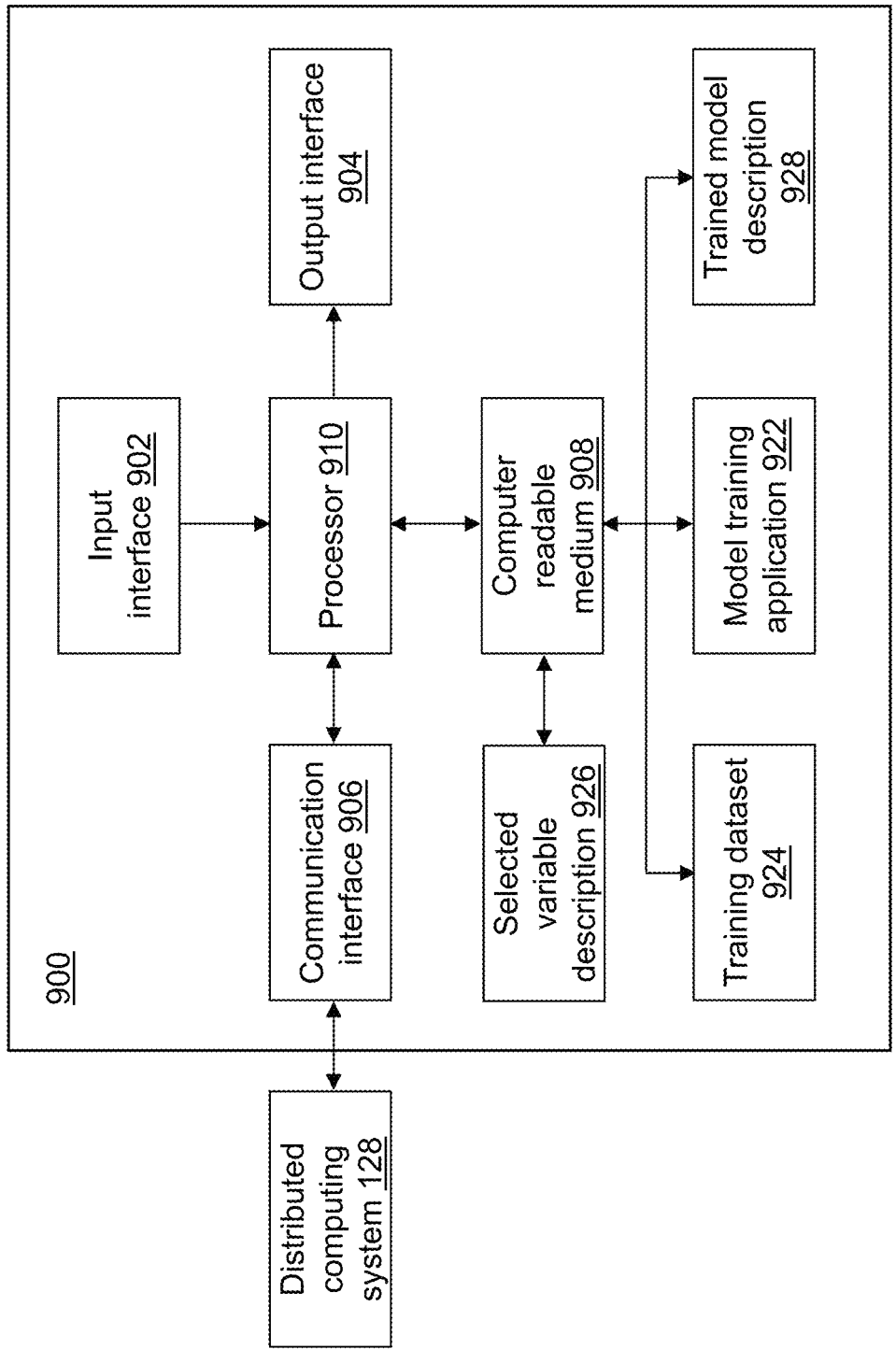
FIG. 9 depicts a block diagram of a model training device that uses variables identified as part of the model selection to train a model and predict a result in accordance with an illustrative embodiment.

Referring to FIG. 9, a block diagram of a model training device 900 is shown in accordance with an illustrative embodiment. Model training device 900 may include a second input interface 902, a second output interface 904, a second communication interface 906, a second non-transitory computer-readable medium 908, a second processor 910, a model training application 922, selected variable description 926, training dataset 924, and trained model description 928. Selected variable description 926 may be read or extracted from FDOE analysis description 126 as the features selected to train a model based on FDOE dataset 124. Training dataset may be FDOE dataset 124 in an illustrative embodiment. Fewer, different, and/or additional components may be incorporated into model training device 900. Model training device 900 and model selection device 100 may be the same or different devices.

Second input interface 902 provides the same or similar functionality as that described with reference to input interface 102 of model selection device 100 though referring to model training device 900. Second output interface 904 provides the same or similar functionality as that described with reference to output interface 104 of model selection device 100 though referring to model training device 900. Second communication interface 906 provides the same or similar functionality as that described with reference to communication interface 106 of model selection device 100 though referring to model training device 900. Data and messages may be transferred between model training device 900 and distributed computing system 128 using second communication interface 906. Second computer-readable medium 908 provides the same or similar functionality as that described with reference to computer-readable medium 108 of model selection device 100 though referring to model training device 900. Second processor 910 provides the same or similar functionality as that described with reference to processor 110 of model selection device 100 though referring to model training device 900.

Model training application 922 performs operations associated with training a model to predict values for response variable y using the selected variables to define observation vectors x from data stored in training dataset 924. The parameters that describe the trained model may be stored in trained model description 928. Dependent on the type of data stored in FDOE dataset 124 and training dataset 924, the trained model may identify anomalies as part of process control, for example, of a manufacturing process, for machine condition monitoring, for example, an electrocardiogram device, etc. Some or all of the operations described herein may be embodied in model training application 922. The operations may be implemented using hardware, firmware, software, or any combination of these methods.

Referring to the example embodiment of FIG. 9, model training application 922 is implemented in software (comprised of computer-readable and/or computer-executable instructions) stored in second computer-readable medium 908 and accessible by second processor 910 for execution of the instructions that embody the operations of model training application 922. Model training application 922 may be written using one or more programming languages, assembly languages, scripting languages, etc. Model training application 922 may be integrated with other analytic tools. For example, model training application 922 may be implemented using or integrated with one or more SAS software tools such as JMP®, Base SAS, SAS/STAT®, of SAS® Enterprise Miner™ SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of model training application 922 further may be performed by an ESPE. Model training application 922 and model selection application 122 further may be integrated applications. Model training application 922 may be implemented as a Web application.

FDOE dataset 124 and training dataset 924 may be generated, stored, and accessed using the same or different mechanisms. Similar to FDOE dataset 124, training dataset 924 may include a plurality of rows and a plurality of columns with the plurality of rows referred to as observation vectors or records, and the columns referred to as variables that are associated with an observation. Training dataset 924 may be transposed.

Similar to FDOE dataset 124, training dataset 924 may be stored on second computer-readable medium 908 or on one or more computer-readable media of distributed computing system 128 and accessed by model training device 900 using second communication interface 906. Data stored in training dataset 924 may be a sensor measurement or a data communication value, may be generated or captured in response to occurrence of an event or a transaction, generated by a device such as in response to an interaction by a user with the device. The data stored in training dataset 924 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 924 may be captured at different time points periodically, intermittently, when an event occurs, etc. One or more columns may include a time value. Similar to FDOE dataset 124, data stored in training dataset 924 may be generated as part of the IoT, and some or all data may be pre- or post-processed by an ESPE.

Similar to FDOE dataset 124, training dataset 924 may be stored in various compressed formats such as a coordinate format, a compressed sparse column format, a compressed sparse row format, etc. Training dataset 924 further may be stored using various structures as known to those skilled in the art including a file system, a relational database, a system of tables, a structured query language database, etc. on model selection device 100, on model training device 900, and/or on distributed computing system 128. Model training device 900 and/or distributed computing system 128 may coordinate access to training dataset 924 that is distributed across a plurality of computing devices. For example, training dataset 924 may be stored in a cube distributed across a grid of computers as understood by a person of skill in the art. As another example, training dataset 924 may be stored in a multi-node Hadoop® cluster. As another example, training dataset 924 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in training dataset 924.

Figure 10:
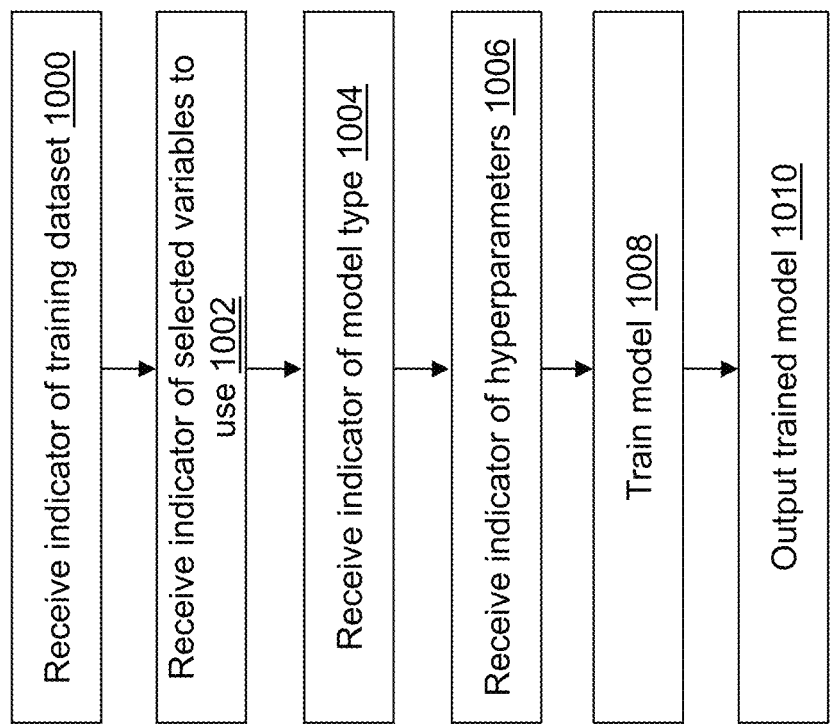
FIG. 10 depicts a flow diagram illustrating examples of operations performed by the model training device of FIG. 9 in accordance with an illustrative embodiment.

Referring to FIG. 10, example operations of model training application 922 are described. Additional, fewer, or different operations may be performed depending on the embodiment of model training application 922. The order of presentation of the operations of FIG. 10 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1000, an eighth indicator may be received that indicates training dataset 924. For example, the eighth indicator indicates a location and a name of training dataset 924. As an example, the eighth indicator may be received by model training application 922 after selection from a user interface window or after entry by a user into a user interface window. In an alternative embodiment, training dataset 924 may not be selectable. For example, a most recently created dataset may be used automatically. Training dataset 924 includes a number of observation vectors N.

In an operation 1002, a ninth indicator may be received that indicates a plurality of variables or features read from selected variable description 926 that are to be included in training a predictive model using training dataset 924. For example, the ninth indicator may indicate a plurality of column numbers or a plurality of column names. As another option, all of the columns may be used by default. Each observation vector $x_i$, i=1, ..., m read from training dataset 924 may include a value for each variable of the plurality of variables to define m dimensions or features. Training dataset 924 includes a set of observation vectors $X=[x_{j,i}]$, i=1, ..., m, j=1, ..., N.

In an operation 1004, a tenth indicator indicates a model type. For example, the tenth indicator indicates a name of a model type that performs prediction and/or classification. The tenth indicator may be received by model training application 922 from a user interface window or after entry by a user into a user interface window. A default value for the model type may further be stored, for example, in second computer-readable medium 908. As an example, a model type may be selected from "SVM", "K-Cluster", "Neural Network", "Logistic Regression", "Forest", "Gradient Boosting", "Decision Tree", "Factorization Machine", etc. The model type indicated by "SVM" may refer to a support vector machine (SVM) model type. The model type indicated by "K-Cluster" may refer to a k-means clustering model type. The model type indicated by "Neural Network" may refer to a neural network model type. The model type indicated by "Logistic Regression" may refer to a logistic regression model type. The model type indicated by "Forest" may refer to a random forest model type. The model type indicated by "Gradient Boosting" may refer to a gradient boosting model type. The model type indicated by "Decision Tree" may refer to a decision tree model type. The model type indicated by "Factorization Machine" may refer to a factorization machine model type. For example, a default model type may be indicated by "Gradient Boosting". Of course, the model type may be labeled or selected in a variety of different manners by the user as understood by a person of skill in the art. In an alternative embodiment, the model type may not be selectable, and a single model type is implemented by model training application 922. For example, the model type indicated as "Gradient Boosting" may be used by default or without allowing a selection.

In an operation 1006, an eleventh indicator of one or more hyperparameters to use for training and validating the indicated model type and/or specified values for an automatic tuning method (autotune option) are received. Hyperparameters define values or various options that govern a training process based on the model type. The default values of these hyperparameters may not be suitable for all applications. To reduce the effort in adjusting these hyperparameters, an automatic tuning process may be used to estimate values for these hyperparameters. Optionally, the hyperparameters may be selected as an input option by a user.

In an operation 1008, a model is trained using the values of the selected variables indicated in operation 1002 for each observation vector read from training dataset 924 indicated in operation 1000 based on the model type indicated in operation 1004, and the hyperparameters indicated in operation 1006. For example, the model may be trained and validated using another application that is distinct from model training application 922 or is integrated with model training application 922. Model training application 922 performs operations associated with defining trained model description 928. For illustration, a TREESPLIT Procedure included in SAS® Visual Data Mining and Machine Learning 8.1: Statistical Procedures developed and provided by SAS Institute Inc. of Cary, N.C., USA may be used for a decision tree model type; a FACTMAC procedure included in SAS® Visual Data Mining and Machine Learning 8.1: Data Mining and Machine Learning Procedures developed and provided by SAS Institute Inc. of Cary, N.C., USA may be used for a factorization machine model type; a FOREST procedure included in SAS® Visual Data Mining and Machine Learning 8.1: Data Mining and Machine Learning Procedures developed and provided by SAS Institute Inc. of Cary, N.C., USA may be used for a random forest model type; a GRADBOOST procedure included in SAS® Visual Data Mining and Machine Learning 8.1: Data Mining and Machine Learning Procedures developed and provided by SAS Institute Inc. of Cary, N.C., USA may be used for a gradient boosting model type; a NNET procedure included in SAS® Visual Data Mining and Machine Learning 8.1: Data Mining and Machine Learning Procedures developed and provided by SAS Institute Inc. of Cary, N.C., USA may be used for a gradient boosting model type; a SVMACHINE procedure included in SAS® Visual Data Mining and Machine Learning 8.1: Data Mining and Machine Learning Procedures developed and provided by SAS Institute Inc. of Cary, N.C., USA may be used for a support vector machine model type; a HPLOGISTIC procedure included in SAS/STAT® 15.1 developed and provided by SAS Institute Inc. of Cary, N.C., USA may be used for a logistic regression model type; a KCLUS procedure included in SAS® Visual Data Mining and Machine Learning 8.1: Statistical Procedures developed and provided by SAS Institute Inc. of Cary, N.C., USA may be used for a k-means clustering model type; etc.

In an operation 1010, the data that describes the trained model is stored in trained model description 928. For illustration, the trained model may be stored using the ASTORE procedure provided by SAS® Visual Data Mining and Machine Learning software. The trained model can then be used by prediction application 922 to predict a response variable value though by instantiating the trained model using trained model description 928 instead of basis function description 926.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

read a dataset that includes a plurality of observation vectors defined for each value of a plurality of values of a group variable, wherein each observation vector of each plurality of observation vectors includes an explanatory variable value of an explanatory variable and a response variable value of a response variable;

(A) select a next group variable value from the plurality of values of the group variable;

(B) sort in ascending order the explanatory variable values of the plurality of observation vectors having the selected next group variable value;

(C) store the response variable value associated with each sorted explanatory variable value from (B) in a next row of a data matrix;

(D) repeat (A) through (C) until each unique group variable value is selected from the plurality of values of the group variable in (A);

(E) increment an eigenfunction index;
(F) perform a functional principal component analysis (FPCA) using the data matrix to define an eigenfunction for the incremented eigenfunction index;
(G) repeat (E) and (F) until a predefined number of eigenfunctions is defined in (E) or an eigenfunctions complete value indicates that defining eigenfunctions is done;
(H) present FPCA results from the performed FPCA within a window of a display, wherein the FPCA results include an eigenvalue and an eigenfunction associated with the eigenvalue for each functional principal component identified from the performed FPCA in (F);
receive an indicator of a request to perform functional analysis using the FPCA results and the dataset based on a predefined factor variable, wherein the indicator is received in association with the window of the display, wherein each observation vector of each plurality of observation vectors further includes a factor variable value of the predefined factor variable;
(I) train a model using the eigenvalue and the eigenfunction computed as a result of the performed FPCA for each plurality of observation vectors using the factor variable value associated with each observation vector of each plurality of observation vectors as a model effect; and
(J) present trained model results from the trained model within a sub-window of the window of the display.

2. The non-transitory computer-readable medium of claim 1, wherein, after (A) and before (B), the computer-readable instructions further cause the computing device to replace a missing explanatory variable value with a linearly interpolated value computed by linearly interpolating between a previous explanatory variable value and a next explanatory variable value of the of the plurality of observation vectors having the selected next group variable value.

3. The non-transitory computer-readable medium of claim 1, wherein, after (D) and before (E), the computer-readable instructions further cause the computing device to:
compute a mean value for each column of the data matrix from the data stored in a respective column of the data matrix; and
center the data matrix using the computed mean value for each column of the data matrix.

4. The non-transitory computer-readable medium of claim 3, wherein the data matrix is centered using $M_{i,j}=M_{i,j}-\mu_j$, $i=1, \ldots, N_g$, $j=1, \ldots, N$, where $M_{i,j}$ is an $i$, $j^{th}$ element of the data matrix, $\mu_j$ is the mean value computed for a $j^{th}$ column of the data matrix, $N_g$ is a number of unique group variable values of the plurality of values of the group variable, and N is a number of observation vectors of the plurality of observation vectors having the selected next group variable value.

5. The non-transitory computer-readable medium of claim 4, wherein the mean value is computed for the $j^{th}$ column of the data matrix using $\mu_j=$ $$\mu_j = \frac{1}{N_g}\sum_{i=1}^{N_g} M_{i,j}, j=1, \ldots, N.$$

6. The non-transitory computer-readable medium of claim 1, wherein, after (F) and before (G), the computer-readable instructions further cause the computing device to normalize the eigenfunction using a normalization factor.

7. The non-transitory computer-readable medium of claim 6, wherein the eigenfunction is normalized using $e_k=e_k/F$, where $e_k$ is a $k^{th}$ eigenfunction, k is the eigenfunction index incremented in (E), and F is the normalization factor.

8. The non-transitory computer-readable medium of claim 7, wherein the normalization factor is computed using $F=\sqrt{(N-1)/N}$, where N is a number of observation vectors of each plurality of observation vectors.

9. The non-transitory computer-readable medium of claim 1, wherein, after (F) and before (G), the computer-readable instructions further cause the computing device to smooth the eigenfunction using a smoothing function.

10. The non-transitory computer-readable medium of claim 9, wherein the smoothing function is selected from the group consisting of a b-splines basis function, a p-splines basis function, a power basis function, a Fourier basis function, a wavelets function, and an exponential basis function.

11. The non-transitory computer-readable medium of claim 1, wherein, after (F) and before (G), the computer-readable instructions further cause the computing device to normalize the eigenfunction to have a unit norm.

12. The non-transitory computer-readable medium of claim 11, wherein the eigenfunction is normalized to have unit norm using $e_k[i]=$ $$e_k[i] = \frac{e_k[i]}{F},$$

$i=1, \ldots, N$, where $e_k$ is a $k^{th}$ eigenfunction, k is the eigenfunction index incremented in (E), F is a normalization factor, and N is a number of observation vectors of each plurality of observation vectors.

13. The non-transitory computer-readable medium of claim 12, wherein the normalization factor is computed using $F=\sqrt{e_k^\tau e_k}$, where $\tau$ indicates a transpose.

14. The non-transitory computer-readable medium of claim 1, wherein, after (F) and before (G), the computer-readable instructions further cause the computing device to orthogonalize the eigenfunction to the previous k−1 eigenfunctions.

15. The non-transitory computer-readable medium of claim 14, wherein the eigenfunction is orthogonalized to the previous k−1 eigenfunctions using $e_k[i]=e_k[i]*(1-$ $$e_k[i] = e_k[i] * \left(1 - \frac{e_{k-1}^\tau e_k}{e_{k-1}^\tau e_{k-1}}\right),$$

$i=1, \ldots, N$, where $e_k$ is a $k^{th}$ eigenfunction, k is the eigenfunction index incremented in (E), N is a number of observation vectors of each plurality of observation vectors, and $\tau$ indicates a transpose.

16. The non-transitory computer-readable medium of claim 14, wherein, after (F) and before (G), the computer-readable instructions further cause the computing device to compute a functional principal component score from the orthogonalized eigenfunction.

17. The non-transitory computer-readable medium of claim 16, wherein the functional principal component score is computed using $FPC_i=M_i^\tau e_k$, $i=1, \ldots, N_g$, where $FPC_i$ is an $i^{th}$ functional principal component score value, $M_i$ is an $i^{th}$ row of the data matrix, $e_k$ is a $k^{th}$ orthogonalized eigenfunction, k is the eigenfunction index incremented in (E), $N_g$ is a number of unique group variable values of the plurality of values of the group variable, and τ indicates a transpose.

18. The non-transitory computer-readable medium of claim 16, wherein, after (F) and before (G), the computer-readable instructions further cause the computing device to remove elements from the data matrix based on the computed functional principal component score.

19. The non-transitory computer-readable medium of claim 18, wherein elements are removed from the data matrix using $M_{i,j}=M_{i,j}-FPC_i \times e_k[i]$, $i=1, \ldots, N_g$, $j=1, \ldots, N$, where $M_{i,j}$ is an i, $j^{th}$ element of the data matrix, $FPC_i$ is an $i^{th}$ functional principal component score value, $e_k$ is a $k^{th}$ orthogonalized eigenfunction, k is the eigenfunction index incremented in (E), $N_g$ is a number of unique group variable values of the plurality of values of the group variable, N is a number of observation vectors of the plurality of observation vectors having the selected next group variable value, and where x indicates a cross product.

20. The non-transitory computer-readable medium of claim 1, wherein a selector associated with the first window of the display provides user selection of a type of model to train.

21. The non-transitory computer-readable medium of claim 20, wherein the type of model to train is selected from the group consisting of a generalized regression model and a neural network model.

22. The non-transitory computer-readable medium of claim 20, wherein the type of model to train is a generalized regression model and a second selector associated with the first window of the display provides user selection of a response distribution method used by the generalized regression model.

23. The non-transitory computer-readable medium of claim 20, wherein the type of model to train is a generalized regression model and a second selector associated with the first window of the display provides user selection of an estimation method used by the generalized regression model.

24. The non-transitory computer-readable medium of claim 20, wherein the type of model to train is a generalized regression model and a second selector associated with the first window of the display provides user selection of a validation method used by the generalized regression model.

25. The non-transitory computer-readable medium of claim 1, wherein, after (J), a selector associated with the window of the display provides user modification of a current factor variable value for one of a plurality of predefined factor variables, wherein (I) and (J) are automatically repeated in response to the user modification of the current factor variable value.

26. The non-transitory computer-readable medium of claim 25, wherein the computer-readable instructions further cause the computing device to:
train a second model using observation vector values associated with the explanatory variable, the response variable, and the user modified factor variable value;
read a second explanatory variable value from a scoring dataset;
compute a new response variable value using the trained second model; and
output the computed new response variable value.

27. The non-transitory computer-readable medium of claim 1, wherein, after (H), a selector associated with the window of the display provides user control of a number of functional principal components identified from the performed FPCA.

28. A computing device comprising:
a processor; and
a non-transitory computer-readable medium operably coupled to the processor, the computer-readable medium having computer-readable instructions stored thereon that, when executed by the processor, cause the computing device to
read a dataset that includes a plurality of observation vectors defined for each value of a plurality of values of a group variable, wherein each observation vector of each plurality of observation vectors includes an explanatory variable value of an explanatory variable and a response variable value of a response variable;
(A) select a next group variable value from the plurality of values of the group variable;
(B) sort in ascending order the explanatory variable values of the plurality of observation vectors having the selected next group variable value;
(C) store the response variable value associated with each sorted explanatory variable value from (B) in a next row of a data matrix;
(D) repeat (A) through (C) until each unique group variable value is selected from the plurality of values of the group variable in (A);
(E) increment an eigenfunction index;
(F) perform a functional principal component analysis (FPCA) using the data matrix to define an eigenfunction for the incremented eigenfunction index;
(G) repeat (E) and (F) until a predefined number of eigenfunctions is defined in (E) or an eigenfunctions complete value indicates that defining eigenfunctions is done;
(H) present FPCA results from the performed FPCA within a window of a display, wherein the FPCA results include an eigenvalue and an eigenfunction associated with the eigenvalue for each functional principal component identified from the performed FPCA in (F);
receive an indicator of a request to perform functional analysis using the FPCA results and the dataset based on a predefined factor variable, wherein the indicator is received in association with the window of the display, wherein each observation vector of each plurality of observation vectors further includes a factor variable value of the predefined factor variable;
(I) train a model using the eigenvalue and the eigenfunction computed as a result of the performed FPCA for each plurality of observation vectors using the factor variable value associated with each observation vector of each plurality of observation vectors as a model effect; and
(J) present trained model results from the trained model within a sub-window of the window of the display.

29. A method of providing direct functional principal component analysis, the method comprising:
reading, by a computing device, a dataset that includes a plurality of observation vectors defined for each value of a plurality of values of a group variable, wherein each observation vector of each plurality of observation vectors includes an explanatory variable value of an explanatory variable and a response variable value of a response variable;
(A) selecting, by the computing device, a next group variable value from the plurality of values of the group variable;

(B) sorting, by the computing device, in ascending order the explanatory variable values of the plurality of observation vectors having the selected next group variable value;

(C) storing, by the computing device, the response variable value associated with each sorted explanatory variable value from (B) in a next row of a data matrix;

(D) repeating, by the computing device, (A) through (C) until each unique group variable value is selected from the plurality of values of the group variable in (A);

(E) incrementing, by the computing device, an eigenfunction index;

(F) performing, by the computing device, a functional principal component analysis (FPCA) using the data matrix to define an eigenfunction for the incremented eigenfunction index;

(G) repeating, by the computing device, (E) and (F) until a predefined number of eigenfunctions is defined in (E) or an eigenfunctions complete value indicates that defining eigenfunctions is done;

(H) presenting, by the computing device, FPCA results from the performed FPCA within a window of a display, wherein the FPCA results include an eigenvalue and an eigenfunction associated with the eigenvalue for each functional principal component identified from the performed FPCA in (F);

receiving, by the computing device, an indicator of a request to perform functional analysis using the FPCA results and the dataset based on a predefined factor variable, wherein the indicator is received in association with the window of the display, wherein each observation vector of each plurality of observation vectors further includes a factor variable value of the predefined factor variable;

(I) training, by the computing device, a model using the eigenvalue and the eigenfunction computed as a result of the performed FPCA for each plurality of observation vectors using the factor variable value associated with each observation vector of each plurality of observation vectors as a model effect; and (J) presenting, by the computing device, trained model results from the trained model within a sub-window of the window of the display.

* * * * *

UNITED STATES PATENT AND TRADEMARK OFFICE
CERTIFICATE OF CORRECTION

PATENT NO. : 11,100,395 B2  
APPLICATION NO. : 17/158062  
DATED : August 24, 2021  
INVENTOR(S) : Parker et al.

Page 1 of 2

It is certified that error appears in the above-identified patent and that said Letters Patent is hereby corrected as shown below:

In the Specification

Column 12, Line 24:
Delete the phrase "where τ indicates a transpose." and replace with --where T indicates a transpose.--.

Column 12, Line 41:
Delete the phrase "$FPC_i = M_i^\tau e_{k,o}$," and replace with --$FPC_i = M_i^\mathsf{T} e_{k,o}$,--.

In the Claims

Claim 13, Column 28, Line 38:
Delete the phrase "$F = \sqrt{e_k^\tau e_k}$, where τ indicates a transpose." and replace with --$F = \sqrt{e_k^\mathsf{T} e_k}$, where T indicates a transpose.--.

Claim 15, Column 28, Lines 46-50:
Delete the phrase "using $e_k[i] = e_k[i] * (1 - \ e_k[i] = e_k[i] * (1 - \frac{e_{k-1}^\mathsf{T} e_k}{e_{k-1}^\mathsf{T} e_{k-1}})$," and replace with --using $e_k[i] = e_k[i] * (1 - \frac{e_{k-1}^\mathsf{T} e_k}{e_{k-1}^\mathsf{T} e_{k-1}})$,--.

Claim 15, Column 28, Line 56:
Delete the phrase "and τ indicates a transpose." and replace with --and T indicates a transpose.--.

Claim 17, Column 28, Line 64:
Delete the phrase "$FPC_i = M_i^\tau e_k$," and replace with --$FPC_i = M_i^\mathsf{T} e_k$,--.

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*

Claim 17, Column 29, Line 2:
Delete the phrase "and $\tau$ indicates a transpose." and replace with --and T indicates a transpose.--.